US012661773B2

(12) United States Patent
Hartmann et al.

(10) Patent No.: US 12,661,773 B2
(45) Date of Patent: Jun. 23, 2026

(54) ENERGY SUPPLY DEVICE HAVING A ROTATABLY MOUNTED LOCKING ELEMENT AND POWER TOOL FOR CONNECTION TO SUCH AN ENERGY SUPPLY DEVICE

(71) Applicant: Hilti Aktiengesellschaft, Schaan (LI)

(72) Inventors: Markus Hartmann, Mauerstetten (DE); Rory Britz, Starnberg (DE); Markus Holubarsch, Landsberg am Lech (DE); David Klingen, Munich (DE); Robert Stanger, Kaufbeuren (DE); Stefan Schmid, Untermühlhausen (DE); Bernhard Liebert, Pfaffenhofen A.D. Glonn (DE); Ali Schad, Munich (DE); Uwe Hainke, Dresden (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/714,684

(22) PCT Filed: Nov. 14, 2022

(86) PCT No.: PCT/EP2022/081797
§ 371 (c)(1),
(2) Date: May 30, 2024

(87) PCT Pub. No.: WO2023/099182
PCT Pub. Date: Jun. 8, 2023

(65) Prior Publication Data
US 2025/0033181 A1    Jan. 30, 2025

(30) Foreign Application Priority Data

| Dec. 1, 2021 | (EP) | 20211575 |
| Dec. 1, 2021 | (EP) | 20211577 |
| Jan. 11, 2022 | (EP) | 22150925 |

(51) Int. Cl.
| B25F 5/02 | (2006.01) |
| H01M 50/247 | (2021.01) |
| H01M 50/262 | (2021.01) |

(52) U.S. Cl.
CPC ............. B25F 5/02 (2013.01); H01M 50/247 (2021.01); H01M 50/262 (2021.01); H01M 2220/30 (2013.01)

(58) Field of Classification Search
CPC ........... H01M 2220/30; H01M 50/262; H01M 50/247
See application file for complete search history.

(56) References Cited

U.S. PATENT DOCUMENTS

| 4,794,273 A | 12/1988 | McCoullough et al. |
| 6,675,912 B2 | 1/2004 | Carrier et al. |
| (Continued) | | |

FOREIGN PATENT DOCUMENTS

| CN | 206689480 U | 12/2017 |
| CN | 210684352 U | 6/2020 |
| (Continued) | | |

*Primary Examiner* — Daniel Jeremy Leeds
(74) *Attorney, Agent, or Firm* — Davidson Kappel LLC

(57) ABSTRACT

An energy supply device is provided, in particular for a power tool, the energy supply device being detachably connectable to the power tool. The energy supply device includes at least one element for locking the energy supply device in the power tool, wherein the at least one locking element is mounted rotatably about at least one first axis of rotation, wherein the first axis of rotation runs through a pivot point of the at least one locking element. In this case, the pivot point of the locking element precedes a locking location in an insertion direction. The energy supply device has at least one element for actuation by a user, wherein the at least one actuating element is mounted rotatably about at least one second axis of rotation which runs through a pivot point of the actuating element. In this case, the pivot point (Continued)

of the at least one locking element can precede a locking location in an insertion direction. In a second aspect, the invention relates to a power tool having a energy supply device.

16 Claims, 10 Drawing Sheets

(56)                References Cited

U.S. PATENT DOCUMENTS

| | | |
|---|---|---|
| 7,119,516 B2 | 10/2006 | Denning et al. |
| 7,900,524 B2 | 3/2011 | Calloway et al. |
| 11,205,820 B2 | 12/2021 | Hanawa et al. |
| 2003/0054230 A1 | 3/2003 | Al-Hallaj et al. |
| 2004/0146777 A1 | 7/2004 | Forlino et al. |
| 2004/0175609 A1 | 9/2004 | Yageta et al. |
| 2007/0210744 A1 | 9/2007 | Watson et al. |
| 2008/0084181 A1 | 4/2008 | Griffin et al. |
| 2008/0102684 A1 | 5/2008 | Matthias et al. |
| 2009/0148755 A1 | 6/2009 | Heinzen et al. |
| 2009/0269654 A1 | 10/2009 | Kairawicz et al. |
| 2010/0176766 A1 | 7/2010 | Brandner et al. |
| 2012/0040235 A1 | 2/2012 | Cho et al. |
| 2012/0293096 A1 | 11/2012 | Mizoguchi et al. |
| 2013/0278222 A1 | 10/2013 | Seiler et al. |
| 2014/0087246 A1 | 3/2014 | Yamamoto et al. |
| 2014/0131059 A1 | 5/2014 | Verbrugge et al. |
| 2014/0147718 A1 | 5/2014 | Furui et al. |
| 2014/0326477 A1 | 11/2014 | Thorson et al. |
| 2015/0151423 A1 | 6/2015 | Burger et al. |
| 2015/0357683 A1 | 12/2015 | Lohr et al. |
| 2016/0072106 A1 | 3/2016 | Baumgartner et al. |
| 2016/0072269 A1 | 3/2016 | Eschendal et al. |
| 2016/0126533 A1 | 5/2016 | Velderman et al. |
| 2017/0346324 A1 | 11/2017 | Hunger et al. |
| 2017/0352847 A1 | 12/2017 | Klee et al. |
| 2018/0069208 A1 | 3/2018 | Rejman et al. |
| 2018/0248418 A1 | 8/2018 | Walme et al. |
| 2018/0366697 A1 | 12/2018 | Elfering et al. |
| 2019/0259984 A1 | 8/2019 | Nishikawa et al. |
| 2019/0259985 A1 | 8/2019 | Hanawa et al. |
| 2019/0326716 A1 | 10/2019 | Nowalis et al. |
| 2019/0334302 A1 | 10/2019 | Maier et al. |
| 2020/0094329 A1 | 3/2020 | Meixner et al. |
| 2020/0127339 A1 | 4/2020 | Nakano et al. |
| 2020/0153142 A1 | 5/2020 | Meixner et al. |
| 2020/0162007 A1 | 5/2020 | Sheeks et al. |
| 2020/0215680 A1 | 7/2020 | Meixner et al. |
| 2021/0083237 A1* | 3/2021 | Cherry ................. H01M 50/24 |
| 2021/0246615 A1 | 8/2021 | Gaspard et al. |
| 2022/0045399 A1* | 2/2022 | Hennesy ............ H01M 50/247 |
| 2022/0181813 A1 | 6/2022 | Meixner et al. |
| 2022/0260440 A1 | 8/2022 | Goyal et al. |
| 2022/0288764 A1 | 9/2022 | Hauser et al. |

FOREIGN PATENT DOCUMENTS

| | | |
|---|---|---|
| CN | 111816818 A | 10/2020 |
| CN | 112 670723 | 4/2021 |
| DE | 202007014418 U1 | 12/2007 |
| DE | 102006050816 A1 | 4/2008 |
| DE | 102012209925 A1 | 12/2013 |
| DE | 21 2012 000140 U1 | 2/2014 |
| DE | 102013226232 A1 | 6/2014 |
| DE | 102013008829 A1 | 11/2014 |
| DE | 102014110073 A1 | 1/2016 |
| DE | 10 2014 217987 A1 | 3/2016 |
| DE | 10 2015 110308 A1 | 9/2016 |
| DE | 102016203431 A1 | 9/2016 |
| DE | 102016209965 A1 | 12/2017 |
| DE | 10 2016 120329 A1 | 4/2018 |
| DE | 102017217495 A1 | 4/2019 |
| DE | 102017217503 A1 | 4/2019 |
| EP | 2178135 A1 | 4/2010 |
| EP | 2416407 A1 | 2/2012 |
| EP | 2207249 B1 | 7/2015 |
| EP | 3035484 A1 | 6/2016 |
| EP | 3340364 A1 | 6/2018 |
| EP | 3392974 A1 | 10/2018 |
| EP | 3395505 A1 | 10/2018 |
| EP | 3014690 B1 | 3/2020 |
| EP | 3 651227 A1 | 5/2020 |
| EP | 3653340 A1 | 5/2020 |
| EP | 3756831 A1 | 12/2020 |
| EP | 3834992 A1 | 6/2021 |
| GB | 2431433 A | 4/2007 |
| JP | 2007105816 A | 4/2007 |
| WO | WO 2011051174 A1 | 5/2011 |
| WO | WO 2012084394 A1 | 6/2012 |
| WO | WO2016170476 A1 | 10/2016 |
| WO | WO 2019030030 A1 | 2/2019 |
| WO | WO2020247326 A1 | 12/2020 |
| WO | WO2021108118 A1 | 6/2021 |
| WO | WO2019243756 A1 | 8/2021 |
| WO | WO 2023/099146 A1 | 6/2023 |
| WO | WO2023/099155 A1 | 6/2023 |
| WO | WO2023/099163 A1 | 6/2023 |
| WO | WO2023/099165 A1 | 6/2023 |
| WO | WO2023/099184 A1 | 6/2023 |
| WO | WO2023/099186 A1 | 6/2023 |
| WO | WO2023/099195 A1 | 6/2023 |
| WO | WO 2023/099196 A1 | 6/2023 |
| WO | WO 2023/099198 A1 | 6/2023 |
| WO | WO2023/099202 A2 | 6/2023 |
| WO | WO2023/099203 A1 | 6/2023 |
| WO | WO2023/099653 A1 | 6/2023 |
| WO | WO2023099149 A1 | 6/2023 |
| WO | WO2023099156 A1 | 6/2023 |
| WO | WO2023099181 A1 | 6/2023 |
| WO | WO2023099182 A1 | 6/2023 |
| WO | WO2023099183 A1 | 6/2023 |
| WO | WO2023099194 A1 | 6/2023 |
| WO | WO2023099197 A1 | 6/2023 |
| WO | WO2023099199 A1 | 6/2023 |
| WO | WO2023099168 A1 | 5/2024 |
| WO | WO2023099169 A1 | 5/2024 |

* cited by examiner a)

b)

ENERGY SUPPLY DEVICE HAVING A ROTATABLY MOUNTED LOCKING ELEMENT AND POWER TOOL FOR CONNECTION TO SUCH AN ENERGY SUPPLY DEVICE

The present invention relates to an energy supply device, in particular for a power tool, the energy supply device being detachably connectable to the power tool. In a second aspect, the invention relates to a power tool having a energy supply device.

BACKGROUND OF THE INVENTION

The invention is located in the field of rechargeable energy supply devices. In particular, energy supply devices for power tools are generally designed in such a way that the energy supply devices can be stored in a charging station for charging. While the energy supply device is being charged, the user can continue to operate the power tool with a further energy supply device and thus achieve work progress.

The energy supply device can be connected to the power tool if the energy supply device is intended to supply the power tool with electrical energy during its operation. In this working mode, the energy supply device should be held and fastened securely and stably in the power tool. Various locking mechanisms are known in the prior art for fastening the energy supply device in the power tool. If the energy supply device is to be charged, the energy supply device has to be removed from the power tool. For this purpose, means can be provided on the energy supply device or on the power tool, which means release the locking of the energy supply device in order to release the energy supply device and be able to remove it from the power tool.

SUMMARY OF THE INVENTION

Some of the locking mechanisms known in the prior art require a large amount of construction space. When actuated, other locking mechanisms open up a large opening through which, for example, dust or moisture can penetrate into the interior of the energy supply device. Yet other locking mechanisms which are known in the prior art have individual elements that do not readily interact during the locking and release. This can result in unnecessary wear and abrasion, wherein the wear and the abrasion may disadvantageously shorten the service life of the interface. In particular, it has been shown that locking mechanisms which are based on a linear movement of the actuating elements are often difficult to actuate ergonomically. This is all the more true if the actuation of the actuating elements is made more difficult after ingress of dust. In the case of two-part locking mechanisms, configurations are known in which the interaction of the actuating element and locking element leads to a self-weakening of the locking mechanism. Such locking mechanisms tend to open undesirably under load such that the energy supply device can no longer be held securely in the power tool. In addition, it has proven to be disadvantageous if a locking element is primarily subjected to a tensile load and not to a compressive load. The correspondingly designed locking mechanisms are generally not very robust, especially under dynamic loads and/or with stress concentrations in the component.

For example, DE 20 2007 014418 U1 discloses a locking device, in particular for locking a power tool. The locking device comprises a linearly movable actuating element and a pivotably mounted locking element.

DE 10 2013 226 232 A1 describes a rechargeable battery for a power tool, wherein the rechargeable cells of the battery can be charged by means of an inductive charging coil.

US 2009 0148 775 A1 describes a battery for a power tool, the battery comprising a rotatable component that can be adjusted between two different positions, and a prestressing element with which the rotatable component can be brought into one of the two positions.

It is an object of the present invention to overcome the deficiencies and disadvantages of the prior art and to provide an energy supply device, in particular for a power tool, which is both able to absorb high locking forces and to permit good handling under construction site conditions. In addition, the energy supply device is intended to be robust and durable and be able to be fastened in the power tool in a functionally reliable, stable and robust manner. Another concern of the invention is to provide a power tool with such an energy supply device.

According to the invention, an energy supply device, in particular for a power tool, is provided, the energy supply device being detachably connectable to the power tool. The energy supply device comprises at least one element for locking ("locking element") the energy supply device in the power tool, wherein the at least one locking element is mounted rotatably about at least one axis of rotation, wherein the axis of rotation runs through a pivot point of the at least one locking element. In this case, the pivot point of the locking element precedes a locking location in an insertion direction. The energy supply device has at least one element for actuation by a user, wherein the at least one actuating element is mounted rotatably about at least one second axis of rotation which runs through a pivot point of the actuating element. The locking element is mounted rotatably in such a manner that the locking element can be brought from a release position into a locking position, or vice versa, by rotation about its pivot point. In this case, the locking element is preferably set up to be received in a locking position by an undercut of the power tool. It is preferred in the context of the invention that the power tool has an undercut and/or an indentation, which is referred to as an "undercut" in the context of the invention and is denoted by reference number 26. The undercut in the power tool is preferably set up to receive a rear, upper region of the locking element in a locking position of the locking mechanism. By the locking element being received in the undercut in the power tool, the energy supply device is fixed in the power tool, this fixing preferably being achieved by the fact that a final spatial direction for the movement of the energy supply device in relation to the power tool is blocked or restricted, i.e. limited. A person skilled in the art knows, however, that a certain movement clearance of an order of magnitude of approx. 1 millimeter is possible for the energy supply device. The energy supply device can then no longer move out of the power tool or become detached from the power tool. In the context of the invention, this preferably means that the energy supply device can no longer move forward and, in particular, no longer rearward, out of the power tool. The wording "last direction in space for the movement of the energy supply device" preferably corresponds to the insertion direction or to a removal direction of the energy supply device, with the removal direction of the energy supply device preferably being in the opposite direction to the insertion direction of the energy supply device. The insertion direction preferably corresponds to a first axis of a virtual coordinate system which is used to describe the invention. The second axis preferably corresponds to a movement of the energy supply device upward or downward, while a third axis of the virtual coordinate system preferably corresponds to a lateral movement of the energy supply device. The movement of the energy supply device along the second and/or the third axis of the virtual coordinate system for the description of the invention can be prevented by a linear guide, which is denoted by reference number 20 in the figures.

By latching of the locking element of the energy supply device into the undercut in the power tool, the energy supply device is fastened to the power tool, for example by the energy supply device being held securely in a cavity of the power tool. If the power tool does not have a cavity for receiving an energy supply device, it may be preferable in the context of the invention for the energy supply device to be able to be fastened laterally or below the power tool with the locking mechanism, which has a rotatable locking element.

It is provided according to the invention that the pivot point of the at least one locking element precedes a locking location in an insertion direction. In the context of the invention, this preferably means that the pivot point of the locking element is arranged upstream of a locking location in an insertion direction. In the context of the present invention, a locking location can be defined, at which the energy supply device is locked within the power tool, with this location being able to be defined, for example, by the undercut in the power tool. The undercut can receive the locking element in a locking position when the locking element is rotated to lock the energy supply device and therefore changes its position. By the locking element being received in the undercut in the power tool, the energy supply device can advantageously be fixed or locked in the power tool, said fixing or locking being particularly robust and stable and having also proven to be very effective under construction site conditions.

It may be preferred in the context of the invention that a distance A is defined, which indicates the distance between the locking location and the pivot point of the locking element. The distance A is shown in the figures. The locking mechanism is advantageously based on a rotational mounting of the elements involved, and therefore an ergonomically unfavorable linear movement of the elements involved can advantageously be dispensed with.

By providing the pivot point of the at least one locking element in an insertion direction upstream of a locking location, a particularly space-saving locking mechanism can be provided for an energy supply device. With the locking mechanism, during the release or during the locking there is advantageously no large opening on an outer wall, through which dust or moisture can penetrate into an interior space of the energy supply device. This effectively protects the energy supply device from external influences. In particular, the energy supply device is able to absorb high locking forces due to high accelerations. In addition, with the invention, good handling of the energy supply device can be ensured even under construction site conditions. In particular, the energy supply device can be designed to be robust, durable and compact, and a likewise robust and compact power tool with surprisingly good ergonomic properties and good handling can be provided.

The provision of a preceding pivot point of the locking element has the further advantage that, under construction site conditions, rotatably mounted components are more robust, less sensitive to dust and can be moved without play and more easily than linearly guided components. For an ideal flow of forces, the pivot point of the rotatably mounted locking element is preferably arranged upstream of the locking location in the insertion direction, since the locking element and its support are thereby subjected to a compressive load. It is preferred in the context of the invention that the insertion direction corresponds to a relative movement of energy supply device and power tool when inserting and removing the energy supply device.

It is provided according to the invention that the energy supply device has at least one element for actuation by a user ("actuating element"), wherein the at least one actuating element is mounted rotatably about at least one second axis of rotation, wherein the second axis of rotation runs through a pivot point of the actuating element. The pivot point of the actuating element is preferably arranged in such a way that the pivot point follows a locking location in an insertion direction. In the context of the invention, this preferably means that the pivot point of the actuating element is arranged downstream of a locking location in an insertion direction. At least part of the actuating element is preferably on the outside of the energy supply device, and therefore this outwardly facing part of the actuating element can be actuated by a user of the power tool in order to initiate removal of the energy supply device from the power tool. It is therefore also preferred in the context of the invention to designate the actuating element as an "actuating switch".

It is preferred in the context of the invention that the axis of rotation of the locking element ("first axis of rotation") and the axis of rotation of the actuating element ("second axis of rotation") are oriented substantially parallel. In the context of the invention, this preferably means that the axes of rotation may coincide, i.e. may be identical. However, it is particularly preferred in the context of the invention that the two axes of rotation of the locking element and of the actuating element do not coincide, but rather are spaced apart from one another.

It is preferred in the context of the invention that the at least one locking element has a bulge and the at least one actuating element has a protruding region, wherein the at least one locking element is set up to at least partially receive the at least one actuating element in a locking position. It is very particularly preferred in the context of the invention that the actuating element or its protruding region can be received by the bulge of the locking element. The actuating element is received in a bulge of the locking element in particular in the locking position of the locking mechanism. The engagement of the two elements in one another causes an interlocking effect, which further improves the fixing of the energy supply device in the power tool and thus advantageously increases the locking effect of the locking mechanism. This interlocking has a synergistic effect together with the latching of the rotatable locking element into the undercut in the power tool, such that the interaction of the two effects enables a particularly robust and stable locking of the energy supply device in the power tool.

It is preferred in the context of the invention that a length $L2$ can be defined, which describes a distance between the pivot point of the locking element and a rear tip of the locking element. In addition, a length $L3$ can be defined, which describes a distance between the pivot point of the actuating element and a frontmost tip of the actuating element. The distance from a center point of the pivot point of the locking element or of the actuating element to the respective tip of the element is measured. Furthermore, a length $L1$ can be defined, which describes a distance between the pivot point of the locking element and the pivot point of the actuating element. This length is also measured between the center points of the pivot points, with the length L1 preferably being measured "as the crow flies". The lengths L1, L2 and L3 are shown in particular in FIG. 10. It is preferred in the context of the invention that a sum of the lengths L2 and L3 is greater than the length L1. The effect advantageously achieved by said length ratio of L2+L3>L1 is that the locking element and the actuating element can engage in one another and the energy supply device is stably locked in the power tool.

It is preferred in the context of the invention that the locking element of the energy supply device can be brought from a locking position into a release position by actuation of the actuating switch. The actuating switch can preferably be actuated by a user of the power tool, for example when the energy supply device is to be removed from the power tool in order to be charged. The transfer of the locking element from the locking position into the release position, in which the energy supply device can be removed from the power tool, is made possible in particular by the rotatable mounting of the locking element about its pivot point.

It is preferred in the context of the invention that the energy supply device has at least one prestressing element, the prestressing element being set up to press the locking element into the undercut in the power tool. In the context of the invention, it is very particularly preferred that the at least one prestressing element is set up to prestress the locking element and/or the actuating element and thus to further improve locking of the energy supply device within the power tool. The energy supply device preferably has at least one prestressing element. If the energy supply device has precisely one prestressing element, either the locking element with the prestressing element in the locking position can be pressed into the undercut in the power tool, or the actuating element. For example, a prestressing element can be provided in the region of the actuating element, the prestressing element first pressing the protruding region of the actuating element into the indentation or bulge of the locking element, as a result of which the locking element is pressed into the undercut in the power tool. This transfer of the locking element from the release position into the locking position, assisted by the prestressing element, is referred to as "indirect prestressing" in the context of the invention, because the prestressing by the actuating element and its engagement in the locking element leads to the rotational movement of the locking element. In other words, the rotational movement with which the locking element is transferred from the release position into the locking position can be assisted by the movement of the actuating element into the indentation or bulge of the locking element, the movement of the actuating element being assisted by the at least one prestressing element. The prestressing element can preferably be formed by a spring or another elastic element. In the context of the invention, the prestressing element may also be referred to as a "spring element".

It may also be preferred in the context of the invention that the energy supply device has more than one prestressing element, for example two prestressing elements. A prestressing element can then preferably be assigned both to the locking element and to the actuating element, and both elements can be pressed into the undercut in the power tool by a spring force in order to pass from the release position into the locking position. It may also be preferred in the context of the invention that the at least one prestressing element is used to bring the locking element and/or the actuating element from the release position into the locking position. The at least one prestressing element preferably effects a coupling between the locking element and the actuating element of the locking mechanism. It may also be preferred in the context of the invention that the locking element and/or the actuating element each have two or more prestressing elements.

It is preferred in the context of the invention that the at least one locking element and the at least one actuating element form a locking mechanism which is designed in one part or at least in two parts. In the context of the invention, this preferably means that the locking mechanism can have two separate elements, namely a locking element and an actuating element ("two-part locking mechanism"). It may also be preferred in the context of the invention that the at least one locking element and the at least one actuating element form a locking mechanism which is designed at least in two parts. In the context of the invention, this preferably means that the energy supply device has a locking mechanism which has at least one locking element and at least one actuating element, the locking element and the actuating element being separate elements within the locking mechanism. The two-part design of the locking mechanism can permit a particularly robust locking or fastening of the energy supply device in the power tool, with tests having shown that the locking mechanism which is designed in two parts can absorb particularly large forces.

However, in the context of the invention, it may also be preferred for the locking mechanism to have only one locking element, which is mounted rotatably about a pivot point. In addition, the locking mechanism can be manufactured in one piece ("one-part locking mechanism"), this one component of the locking mechanism being able to have different regions. For example, a first region of the one-part locking mechanism can have a locking function, and therefore this first region of the one-part locking mechanism is preferably referred to as a locking region. A second region of the one-part locking mechanism can also fulfill an actuating function, and therefore this second region of the one-part locking mechanism is preferably referred to as an actuating region.

It is preferred in the context of the invention that the at least one locking element and the at least one actuating element form a locking mechanism which is substantially designed in one part. In other words, the locking mechanism can have an element which is designed in one part and which, for example, has different functional regions. For example, the one-part element can have a first region, the first region serving as a locking element, while a second region of the element serves as an actuating element. It was completely surprising that the invention can be used to provide a robust one-part locking solution that is suitable for construction sites and does not have the usual disadvantages of one-part solutions, such as a lack of mechanical robustness, difficult accessibility, sensitivity to dust or sluggishness, especially after ingress of dust. The surprising advantages can be achieved in the one-part embodiment of the invention, preferably in that the one-part element is rotatably mounted, with the pivot point of the element preceding the locking location in the insertion direction.

It is preferred in the context of the invention that a one-part locking mechanism has either a first axis of rotation, i.e. an axis of rotation in the region of the locking region, or a second axis of rotation, i.e. an axis of rotation in the region of the actuating region.

If the energy supply device is to be connected to the power tool in order to supply the power tool with electrical energy, the energy supply device can be inserted into a cavity in the power tool, for example. In the context of the invention, it may also be preferred that the energy supply device is fastened to an underside or a side wall of the power tool. If the power tool has a cavity for receiving the energy supply device, this cavity is preferably substantially cuboid, with one side of the cavity usually being open. This open side of the cavity may preferably be referred to as "the rear side of the cavity". In addition to the open side, the preferably shaft-like cavity can have a top side, an underside, a front side and two side walls. Preferably the top side and the underside, the two side walls and the front side and the open side of the cavity are on opposite sides of the cavity, i.e. the sides mentioned are each opposite one another.

The open side of the cavity is preferably the insertion opening for the energy supply device. This means that the energy supply device can be introduced through said insertion opening into the power tool or into the cavity provided for it. In the context of the present invention, an insertion direction can be defined which corresponds to the direction in which the energy supply device is introduced into the power tool. This means that the insertion direction extends, starting from the insertion opening, in the direction of the front side of the preferably shaft-like cavity of the power tool. This insertion direction preferably coincides with a first axis of a virtual coordinate system which is used to describe the invention (cf. figures). It is preferred in the context of the invention that a second axis of the virtual coordinate system extends between an underside and a top side of the cavity for receiving the energy supply device, while a third axis of the virtual coordinate system extends between the side surfaces of the receiving shaft for the energy supply device. The axes of the virtual coordinate system are preferably perpendicular to one another. Within the meaning of the virtual coordinate system, the front side of the cavity of the power tool in the insertion direction represents a front region of the energy supply device, because the front side of the cavity is the target, as it were, of the insertion movement. By contrast, the open side of the cavity is a rear side of the cavity.

The energy supply device preferably has a substantially cuboidal basic shape, with the energy supply device having in particular a top side and an underside, a front side and a rear side, and two side surfaces. While the side surfaces of the energy supply device can be designed to be substantially identical or similar, the surface of the energy supply device has an interface for fastening the energy supply device to the power tool, as a result of which it differs from the substantially planar underside of the energy supply device. Such an interface is not present on the underside of the energy supply device, and therefore the top side and the underside of the energy supply device are essentially not of identical or similar design. In the context of the invention, the side with which the energy supply device is first introduced into the cavity in the power tool is preferably the front side of the energy supply device, while the rear side of the energy supply device in the introduced state is present in the region of the open side of the cavity. In a preferred refinement of the invention, this rear side of the energy supply device can wholly or partially form the rear side or rear wall of the power tool in the connected state. In another preferred refinement of the invention, the rear side of the energy supply device can also form a rear wall of a main body of a power tool.

In the context of the invention, it is preferred to refer to the state in which the energy supply device is fastened to the power tool and in which the energy supply device supplies the power tool with electrical energy as an "introduced" or "inserted" state. The introduced or inserted state may also be referred to as a "working mode" or "operating state" of the system consisting of energy supply device and power tool, since the power tool is enabled by the supply of electrical energy to perform work or to be operated. The state in which the energy supply device and the power tool are present separately from one another is referred to as a "disconnected" or "separate" state in the context of the invention. In this disconnected or separate state, the energy supply device can be connected to a charger, for example, in order to be charged.

In the front region of the energy supply device, the interface has those elements and components that allow electrical energy to be transmitted from the energy supply device to the power tool. In addition, means for data exchange between the energy supply device and the power tool can be provided at the interface. These can preferably be power and/or data contacts, which may be spring-mounted, for example. The spring mounting may be arranged, for example, in the region of the energy supply device and/or in the region of the power tool. After insertion of the energy supply device has been completed, the power and/or data contacts come into operative connection with corresponding contacts of the power tool such that a current and/or data flow or exchange can be ensured.

In its rear region, the energy supply device has, on its surface, the locking mechanism with the at least one rotatable locking element. In order to bring about the locking, the locking mechanism has at least one locking element which is mounted rotatably about an axis of rotation. The axis of rotation preferably runs in the third spatial direction or substantially parallel to the third axis of the virtual coordinate system, which is used to describe the invention. The pivot point is preferably that point within the interface of the energy supply device through which the axis of rotation of the locking element runs.

The pivot point of the locking element may be arranged preceding a locking location in an insertion direction. The wording according to which the pivot point of the at least one locking element is arranged in front of a locking location in an insertion direction preferably means in the context of the invention that the pivot point of the locking element is not arranged within the interface of the energy supply device, for example below the locking mechanism, but offset in the spatial direction «forward» at a distance A. In other words, the distance between the power and/or data interface in the front region of the energy supply device and the pivot point is smaller than the distance between the power and/or data interface in the front region of the energy supply device and the locking mechanism in the rear region of the energy supply device. In yet other words, the pivot point of the at least one locking element is closer to the power and/or data interface in the front region of the energy supply device than the locking mechanism of the energy supply device. In yet other words, the pivot point of the locking element of the energy supply device is offset toward a center or a central region of the energy supply device, with the locking mechanism as a whole being at a smaller distance from the rear side of the energy supply device than the pivot point of the locking element of the energy supply device.

The interface, which is preferably arranged on the top side of the energy supply device, can have means for linear guidance of the energy supply device within the cavity of the power tool in the region of the side walls of the energy supply device. The linear guide can include protruding and recessed regions that are designed to interact with corresponding linear guide means on the power tool. The linear guide means of the power tool may, for example, be part of a receiving device, the receiving device being set up to receive the interface of the energy supply device in the inserted state.

The undercut of the power tool is preferably an indentation in the receiving device of the power tool, the indentation being set up to receive the locking element. The indentation can thus form a receiving space for the locking element when the locking element is pressed into the indentation. The movement of the locking element into the undercut of the power tool can advantageously be assisted by the tension of at least one prestressing element. In the context of the invention, it is preferred that the prestressing element is set up to hold the locking element in the locking position. When the protruding region of the locking element snaps into the indentation of the receiving device, the prestressing element can press the locking element into the indentation. During the release, i.e. when the energy supply device is to be separated from the power tool, the prestressing element is relaxed by actuation of an actuating element such that the locking element or its protruding region can slide out of the indentation. This sliding out takes place as a result of the rotational movement of the locking element, which the locking element is capable of owing to the rotatable mounting about its axis of rotation.

It is preferred in the context of the invention that the locking element has a protruding region on a side opposite the pivot point, which region can enter into engagement with the indentation or the undercut in the receiving device of the power tool or can be received by it. The protruding region of the locking element is preferably received in the undercut in the locking position, the energy supply device being fixed or locked there by the locking element entering into engagement with the undercut in the receiving space in the power tool.

When the actuating element is actuated by a user in order to remove the energy supply device from the power tool, a protruding region of the actuating element enters an indentation of the locking element such that the locking element is moved downward. As a result, the protruding region of the locking element is no longer in the indentation of the receiving device and the energy supply device is released with respect to the power tool. In this released state, the energy supply device can be removed from the power tool.

The wording "substantially parallel" is not an unclear concept for a person skilled in the art because they know that the wording also includes minor deviations from the exact, mathematical parallelism in addition to the exact, mathematical parallelism. Such deviations can be, for example, in a range of +/−5% or in a range of +/−5°.

The interface is advantageously designed in such a way that it allows a relative movement of the power tool and the energy supply device in an insertion direction and prevents a relative movement between the power tool and the energy supply device in the other spatial directions. A virtual coordinate system can be used to describe the present invention, in which an insertion direction of the interface preferably coincides with the first axis of rotation of the virtual coordinate system. It is preferred in the context of the invention that a second axis of the virtual coordinate system extends between an underside and a top side of the cavity of the power tool for receiving the energy supply device, while a third axis of the virtual coordinate system extends between the side surfaces of the receiving shaft for the energy supply device. As viewed in relation to the energy supply device, the first axis of rotation preferably extends between the front side of the energy supply device and the rear side of the energy supply device, wherein the energy supply device can be introduced with its front side first into a cavity of the power tool. In relation to the energy supply device, the second axis of rotation of the virtual coordinate system extends between a top side and an underside of the energy supply device, while the third axis of rotation of the virtual coordinate system extends between the side surfaces of the energy supply device. The axes of the virtual coordinate system are preferably perpendicular to one another. Within the meaning of the virtual coordinate system, a front side of the cavity of the power tool in the insertion direction coincides with a front region of the energy supply device, because the front side of the cavity is the target, as it were, of the insertion movement. By contrast, the open side of the cavity preferably coincides with the rear side of the cavity. In particular, in the context of the present invention, an insertion direction can be defined which corresponds to the direction in which the energy supply device is introduced into the power tool. This means that the insertion direction extends, starting from the insertion opening, in the direction of the front side of the preferably shaft-like cavity of the power tool. This insertion direction preferably coincides with a first axis of a virtual coordinate system which is used to describe the invention (cf. figures).

A substantial advantage of the invention results from the fact that the position of the pivot point of the locking element achieves a self-reinforcing effect, which can advantageously reinforce the locking effect of the locking element. This advantage can be achieved in particular if the energy supply device in addition to the locking element also comprises an actuating element, wherein the at least one actuating element is mounted rotatably about at least one second axis of rotation, wherein the second axis of rotation runs through a pivot point of the actuating element. It is preferred in the context of the invention that the energy supply device has at least one element for actuation ("actuating element") by a user, wherein the at least one actuating element is mounted rotatably about at least the second axis of rotation and the second axis of rotation runs through a pivot point of the actuating element. The second axis of rotation, which is preferably the axis of rotation of the actuating element, is preferably oriented substantially parallel to the first axis of rotation, which is preferably the axis of rotation of the locking element. The axis of rotation of the locking element and the axis of rotation of the actuating element preferably also run substantially parallel to the third axis of the virtual coordinate system, which is used to describe the invention. However, it may also be a different spatial direction, such as, for example, the first or the second axis of the virtual coordinate system. It is preferred in the context of the invention that the axes of rotation, about which the at least one locking element and the at least one actuating element are rotatably mounted, run substantially parallel. The locking mechanism is advantageously based on a rotary mounting of the locking element and the actuating element, and therefore an ergonomically unfavorable linear movement of the elements can advantageously be dispensed with.

The inventors have recognized that an interface locking which is designed in two parts and has a rotatably mounted actuating element and a rotatably mounted locking element, and also suitably placed pivot points, makes it possible to provide a particularly robust locking mechanism that is suitable for construction sites. This advantage is brought about in particular by the self-reinforcing interaction of the actuating element and the locking element. The improvements in terms of robustness and service life are particularly advantageous because it is becoming apparent that the service lives of rechargeable batteries could be extended. It will therefore be welcomed by experts if the present invention can be used to provide a locking mechanism for an energy supply device, in particular for a power tool, which does justice to the longer service life of the future energy supply device.

In particular, with the invention, the energy supply device can be connected to the power tool in a functionally reliable, particularly play-free and robust way in a working mode. The locking mechanism is preferably designed in such a way that it is movable or adjustable between a locking position and a release position. The actuating element and the locking element can assume a locking position or a release position, with an undercut blocking a last remaining degree of freedom of movement of the energy supply device in the locking position. In the release position, an undercut is ineffective, and therefore the energy supply device can be separated from the power tool.

Advantageously, the energy supply device can be inserted into a cavity of the power tool without additional actuation, the locking element preferably being set up to snap into the undercut in a spring-prestressed manner. The prestressing can preferably be generated by a prestressing element, which can be arranged between the energy supply device and the interface. During removal, a release operation can first be carried out by a user, with the locking element being conveyed out of the undercut by the release operation counter to the prestressing of the prestressing element. The energy supply device can then be pulled out of the cavity of the power tool and removed by means of the linear guide. The energy supply device can preferably have at least one prestressing element, the prestressing element being set up to generate a prestress, with which the locking element can be latched into an indentation or an undercut as the energy supply device is being locked. For this purpose, the at least one prestressing element can act, for example, directly on the locking element. Alternatively, the prestressing element can act indirectly on the locking element via the actuating element. In this refinement of the invention, the locking element can be acted on via the actuating element, with it being possible for the actuating element to be set up to press the locking element into the locking position or into the undercut of the power tool. It may also be preferred in the context of the invention that a plurality of prestressing elements are provided, with the at least one prestressing element being able to press the locking element and/or the actuating element into the locking position independently of one another.

Tests have shown that the energy supply device can absorb surprisingly large forces without damaging the locking mechanism. This is particularly advantageous if the energy supply device is used in power tools in which strong vibrations occur during their operation. In addition, large forces may occur in the event of falling or in the event of dropping of the energy supply device. In addition, it has been shown that the actuating element is particularly easily accessible and can be pressed down by a user with their thumb in an ergonomically favorable manner. Furthermore, the operating forces of the locking mechanism can be kept surprisingly low.

The energy supply device can preferably have a prestressing element, the prestressing element being set up to generate a prestress, with which the locking element can be latched into an indentation or an undercut in the receiving device of the power tool as the energy supply device is being locked.

It may also be preferred in the context of the invention that the at least one locking element and the at least one actuating element form a locking mechanism which is designed at least in two parts. In the context of the invention, this preferably means that the energy supply device has a locking mechanism which has at least one locking element and at least one actuating element, the locking element and the actuating element being separate elements within the locking mechanism. The two-part design of the locking mechanism can permit a particularly robust locking or fastening of the energy supply device in the power tool, with tests having shown that the locking mechanism designed in two parts can absorb particularly large forces.

In a second aspect, the invention relates to a power tool which can be connected to at least one energy supply device so that the energy supply device supplies the power tool with electrical energy and enables work with the power tool. The terms, definitions and technical advantages introduced for the energy supply device preferably apply in an analogous manner to the power tool. In the context of the invention, it is preferred that the power tool is connectable to an energy supply device. In other words, the power tool can be connected to an energy supply device for the purpose of supplying energy, the energy supply device having a locking mechanism with a rotatably mounted locking element. It is preferred in the context of the invention that the power tool has an undercut, the undercut preferably forming a receiving space for the locking element of the energy supply device. The undercut of the power tool can in particular be set up to receive the locking element in a locking position of the locking mechanism. It is preferred in the context of the invention that the undercut is arranged in the region of a receiving device of the power tool. Preferably, the "locking location" can be defined by a front surface of the undercut in the power tool, as can be seen in the figures. It is preferred in the context of the invention that an end face of the locking element comes into contact with said front surface of the undercut when the locking element is pressed into the undercut in the power tool in the locking position. The "locking location" is preferably located in the region of this contact between the end face of the locking element and the front surface of the undercut. The end face of the locking element can preferably also be referred to as the "rear tip of the locking element" in the context of the invention. It is preferred in the context of the invention that the pivot point of the locking element precedes said locking location in the insertion direction, while the pivot point of the actuating element follows said locking location in the insertion direction. In other words, the pivot point of the locking element can be arranged upstream of said locking location in the insertion direction, while the pivot point of the actuating element is arranged downstream of said locking location in the insertion direction.

In particular, the invention discloses a system consisting of a power tool and an energy supply device, the energy supply device having a locking mechanism with a rotatably mounted locking element. With the invention, a locking solution for such a system consisting of a power tool and an energy supply device can advantageously be provided, which has both an ergonomically favorable actuating mechanism and a locking mechanism which is functionally particularly secure and robust. This particularly secure and robust locking mechanism is ensured in particular by the rotatably mounted locking element, the pivot point of which can precede a locking location in the insertion direction. In particular, the particularly secure and robust locking mechanism is achieved through a coordinated design of the locking element and an actuating element, and through the synergistic interaction of said elements of the locking mechanism. The locking element and/or the actuating element can be prestressed or pressed into their desired positions by prestressing elements. In particular, the at least one prestressing element can advantageously assist a transfer of the locking element and/or of the actuating element from a release position into a locking position.

The energy supply device may, for example, be based on the new and improved battery technologies and have a service life of at least 600 charging cycles. This preferably corresponds to a capacity throughput of at least 100 Ah/cm$^3$ (capacity/cell volume) with a simultaneous loss of capacity of less than 30% after 600 charge/discharge cycles. If such an energy supply device is used to supply a power tool with electrical power, the interface can be used to carry out more than the hitherto conventional 2500 plug-in or connection cycles between the energy supply device and the power tool without significant wear occurring at the interface. The invention therefore particularly readily meets the future requirements for interfaces that result from the new and improved battery technologies, and particularly robust, powerful, and wear-resistant interfaces for connecting an energy supply device to a power tool can advantageously be provided.

Thus, the invention is able to ensure both high wear resistance and high security against loosening due to acceleration forces without increasing the actuating force when manually loosening the interface. Such energy supply devices can preferably have a capacity throughput of at least 100 Ah/cm$^3$ (capacity/cell volume) with a simultaneous loss of capacity after 600 charge/discharge cycles of less than 30%.

The improvements in terms of robustness and service life are particularly advantageous because it is becoming apparent that the service lives of rechargeable batteries could be extended because of improved battery technologies. It will therefore be welcomed by experts if the present invention can be used to provide an interface solution for an energy supply device, in particular for connection to a power tool, which does justice to the longer service life of the future energy supply device.

It is preferred in the context of the invention that the energy supply device comprises at least one energy storage cell, which is referred to as "cell" in the context of the invention. The at least one cell has an internal resistance DCR_I of less than 10 milliohms (mOhm). In preferred refinements of the invention, the internal resistance DCR_I of the at least one cell can be less than 8 milliohms and preferably less than 6 milliohms. Here, the internal resistance DCR_I is preferably measured in accordance with standard IEC61960. The internal resistance DCR_I represents, in particular, the resistance of a cell of the energy supply device, wherein possible components or accessories of the cell do not make any contribution to the internal resistance DCR_I. A low internal resistance DCR_I is advantageous since in this way absolutely no undesired heat, which has to be dissipated, is produced. The internal resistance DCR_I is, in particular, a DC resistance which can be measured in the interior of a cell of the energy supply device. The internal resistance DCR_I can of course also assume intermediate values such as 6.02 milliohms; 7.49 milliohms; 8.33 milliohms; 8.65 milliohms or 9.5 milliohms.

It has been found that, with the internal resistance DCR_I of the at least one cell of less than 10 milliohms, an energy supply device which has particularly good thermal properties in the sense that it can be operated particularly well at low temperatures can be provided, wherein the cooling expenditure can be kept surprisingly low. In particular, an energy supply device with a cell internal resistance DCR_I of less than 10 milliohms is particularly suitable for supplying electrical energy to particularly powerful power tools. Such energy supply devices can therefore make a valuable contribution to allowing use of battery-operated power tools even in areas of application that those skilled in the art previously assumed were not accessible by battery-operated power tools.

Advantageously, such an energy supply device can create a possibility of supplying a power tool operated by battery or rechargeable battery with an energy supply device according to the invention with a high output power over a long period of time without the surrounding plastics components or the cell chemistry within the cells of the energy supply device being damaged.

It is preferred in the context of the invention for a ratio of a resistance of the at least one cell to a surface area A of the at least one cell to be less than 0.2 milliohm/cm$^2$, preferably less than 0.1 milliohm/cm$^2$ and most preferably less than 0.05 milliohm/cm$^2$. In the case of a cylindrical cell, the surface of the cell can be formed, for example, by the outer surface of the cylinder as well as the top side and the underside of the cell. Furthermore, it may be preferred in the context of the invention for a ratio of a resistance of the at least one cell to a volume V of the at least one cell to be less than 0.4 milliohm/cm$^3$, preferably less than 0.3 milliohm/cm$^3$ and most preferably less than 0.2 millionm/cm$^3$. For conventional geometric shapes, such as cuboids, cubes, spheres or the like, a person skilled in the art knows the formulae for calculating the surface area or the volume of such a geometric body. In the context of the invention, the term "resistance" preferably denotes the internal resistance DCR_I which can preferably be measured in accordance with standard IEC61960. Preferably, this is a direct current resistance.

It is preferred in the context of the invention for the at least one cell to have a heating coefficient of less than 1.0 W/(Ah·A), preferably less than 0.75 W/(Ah·A) and particularly preferably of less than 0.5 W/(Ah·A). Furthermore, the at least one cell can be designed to output a current of greater than 1000 amperes/liter substantially constantly. The discharge current is indicated in respect of the volume of the at least one cell, wherein the space measurement unit "liter" (l) is used as the unit for the volume. The cells according to the invention are therefore able to output a discharge current of substantially constantly greater than 1000 A per liter of cell volume. In other words, a cell with a volume of 1 liter is able to output a substantially constant discharge current of greater than 1000 A, wherein the at least one cell furthermore has a heating coefficient of less than 1.0 W/(Ah·A). In preferred refinements of the invention, the at least one cell of the energy supply device can have a heating coefficient of less than 0.75 W/(Ah·A), preferably less than 0.5 W/(Ah·A). The unit for the heating coefficient is watts/(ampere hours. amperes). The heating coefficient can of course also have intermediate values, such as 0.56 W/(Ah·A); 0.723 W/(Ah·A) or 0.925 W/(Ah·A).

The invention advantageously allows the provision of an energy supply device having at least one cell which exhibits reduced heating and therefore is particularly well suited to supplying power tools in which high powers and high currents, preferably constant currents, are desired for operation. In particular, the invention can be used to provide an energy supply device for a power tool in which the heat which is optionally created during operation of the power tool and when outputting electrical energy to the power tool can be dissipated in a particularly simple and uncomplicated manner. Tests have shown that the invention can not only be used to more effectively dissipate existing heat. Rather, the invention prevents heat being generated or the quantity of heat generated during operation of the power tool can be considerably reduced using the invention. The invention can advantageously be used to provide an energy supply device which can supply electrical energy in an optimum manner primarily also to power tools which have stringent requirements in respect of power and discharge current. In other words, the invention can provide an energy supply device for particularly powerful power tools with which heavy drilling or demolition work is performed on construction sites for example.

In the context of the invention, the term "power tool" is to be understood as meaning a typical piece of equipment that can be used on a construction site, for example a building construction site and/or a civil engineering construction site. They may be hammer drills, chisels, core drills, angle grinders or cut-off grinders, cutting devices or the like, without being restricted thereto. In addition, auxiliary devices such as those occasionally used on construction sites, such as lamps, radios, vacuum cleaners, measuring devices, construction robots, wheelbarrows, transport devices, feed devices or other auxiliary devices can be "power tools" in the context of the invention. The power tool may in particular be a mobile power tool, wherein the energy supply device may be used in particular also in stationary power tools, such as frame-mounted drills or circular saws. However, preference is given to hand-held power tools that are, in particular, operated by rechargeable battery or battery.

It is preferred in the context of the invention for the at least one cell to have a temperature cooling half-life of less than 12 minutes, preferably less than 10 minutes, particularly preferably less than 8 minutes. In the context of the invention, this preferably means that, with free convection, a temperature of the at least one cell is halved in less than 12, 10 or 8 minutes. The temperature cooling half-life is preferably determined in an inoperative state of the energy supply device, that is to say when the energy supply device is not in operation, that is to say is present in a manner connected to a power tool. Energy supply devices with temperature cooling half-lives of less than 8 mins have primarily been found to be particularly suitable for use in powerful power tools. The temperature cooling half-life can of course also have a value of 8.5 minutes, 9 minutes 20 seconds or of 11 minutes 47 seconds.

Owing to the surprisingly low temperature cooling half-life of the energy supply device, the heat generated during operation of the power tool or when it is charging remains within the at least one cell only for a short time. In this way, the cell can be recharged particularly quickly and is rapidly available for re-use in the power tool. Moreover, the thermal loading on the component of the energy supply device or the power tool having the energy supply device can be considerably reduced. As a result, the energy supply device can be preserved and its service life extended.

It is preferred in the context of the invention for the at least one cell to be arranged in a battery pack of the energy supply device. A series of individual cells can preferably be combined in the battery pack and in this way inserted into the energy supply device in an optimum manner. For example, 5, 6 or 10 cells may form a battery pack, with integral multiples of these numbers also being possible. For example, the energy supply device can have individual cell strings which may comprise, for example, 5, 6 or 10 cells. An energy supply device having, for example, three strings of five cells may comprise, for example, 15 individual cells.

In the context of the invention, it is preferred that the energy supply device has a capacity of at least 2.2 Ah, preferably at least 2.5 Ah. Tests have shown that said capacity values are particularly well suited to use of powerful power tools in the construction industry and meet the requirements for availability of electrical energy and possible periods of use of the power tool particularly well there.

The at least one cell of the energy supply device is preferably set up to deliver a discharge current of at least 20 amperes (A) for at least 10 s. For example, a cell of the energy supply device may be configured to provide a discharge current of at least 20 A, in particular at least 25 A, for at least 10 s. In other words, the at least one cell of an energy supply device may be configured to provide a permanent current of at least 20 A, in particular at least 25 A.

Also, it is conceivable that peak currents, in particular short-term peak currents, may lead to a great heating of the energy supply device. Therefore an energy supply device with powerful cooling as may be achieved with the measures described herein is particularly advantageous. For example, it is conceivable that the at least one cell of the energy supply device can provide at least 50 A for 1 second. In other words, in the context of the invention, it is preferred that the at least one cell of the energy supply device is configured to provide a discharge current of at least 50 A for at least 1 second. Power tools may often briefly require high power levels. An energy supply device with cells able to deliver such a peak current and/or such a permanent current may therefore be particularly suitable for powerful power tools as are used on construction sites.

It is preferred in the context of the invention for the at least one cell to comprise an electrolyte, wherein the electrolyte is preferably present in a liquid state of aggregation at room temperature. The electrolyte can comprise lithium, sodium and/or magnesium, without being restricted thereto. In particular, the electrolyte can be lithium-based. As an alternative or in addition, said electrolyte can also be sodium-based. It is also conceivable for the rechargeable battery to be magnesium-based. The electrolyte-based energy supply device can have a rated voltage of at least 10 V, preferably at least 18 V, in particular of at least 28 V, for example 36 V. A rated voltage in a range of from 18 to 22 V, in particular in a range of from 21 to 22 V, is very particularly preferred. The at least one cell of the energy supply device can have, for example, a voltage of 3.6 V, without being restricted thereto.

It is preferred in the context of the invention for the at least one cell of the energy supply device to have a surface area A and a volume V, wherein a ratio A/V of surface area to volume is greater than six times, preferably eight times and particularly preferably ten times the inverse of the cube root of the volume.

The expression that the surface area A of the at least one cell is greater than, for example, eight times the cube root of the square of the volume V can preferably also be expressed by the formula $A>8*V^{\wedge}(\frac{2}{3})$. Written another way, this relationship can be described in that the ratio A/V of surface area to volume is greater than eight times the inverse of the cube root of the volume.

For checking whether the above relationship is fulfilled, values in the same basic unit must always be used. If, for example, a value for the surface area in $m^2$ is used in the above formula, for the volume preferably a value in the unit $m^3$ is used. If, for example, a value for the surface area in the unit $cm^2$ is used in the above formula, for the volume preferably a value in the unit $cm^3$ is used. If, for example, a value for the surface area in the unit $mm^2$ is used in the above formula, for the volume preferably a value in the unit $mm^3$ is used.

Cell geometries which, for example, satisfy the relationship of $A>8*V^{\wedge}(\frac{2}{3})$ advantageously have a particularly favorable ratio between the outer surface of the cell, which is critical for the cooling effect, and the cell volume. The inventors have identified that the ratio of the surface area to the volume of the at least one cell of the energy supply device has an important influence on the removal of heat from the energy supply device. The improved cooling capacity of the energy supply device can advantageously be achieved by increasing the cell surface area for a constant volume and a low internal resistance of the at least one cell. It is preferred in the context of the invention for a low cell temperature given a simultaneously high power output to preferably be able to be rendered possible when the internal resistance of the cell is reduced. The reduction in the internal resistance of the at least one cell can lead to the creation of less heat. Furthermore, a low cell temperature may be achieved owing to the use of cells in which the surface area A of at least one cell within the energy supply device is greater than six times, preferably eight times and particularly preferably ten times the cube root of the square of the volume V of the at least one cell. As a result, in particular the output of heat to the environment can be improved.

It has been found that energy supply devices with cells which satisfy said relationship can be significantly better cooled than previously known energy supply devices with, for example, cylindrical cells. The above relationship can be satisfied, for example, in that although the cells of the energy supply device have a cylindrical basic shape, additional surface-increasing elements are arranged on its surface. Said elements can be, for example, fins, teeth or the like. Cells which do not have a cylindrical basic shape, but rather are shaped entirely differently, can also be used within the scope of the invention. For example, the cells of the energy supply device can have a substantially cuboidal or cube-like basic shape. The term "substantially" is not unclear to a person skilled in the art here because a person skilled in the art knows that, for example, a cuboid with indentations or rounded corners and/or edges should also be covered by the term "substantially cuboidal" in the context of the present invention.

It is preferred in the context of the invention for the at least one cell to have a cell core, wherein there is no point within the cell core that is more than 5 mm away from a surface of the energy supply device. When the energy supply device is discharged, for example when it is connected to a power tool and work is performed with the power tool, heat can be produced in the cell core. In this specific refinement of the invention, this heat can be transported on a comparatively short path as far as the surface of the cell of the energy supply device. The heat can be dissipated in an optimum manner from the surface. Therefore, such an energy supply device can exhibit good cooling, in particular comparatively good self-cooling. The time period until the limit temperature is reached can be extended and/or the situation of the limit temperature being reached can advantageously be entirely avoided. As a further advantage of the invention, a relatively homogeneous temperature distribution can be achieved within the cell core. This can result in uniform aging of the rechargeable battery. This can in turn increase the service life of the energy supply device.

It is preferred in the context of the invention for the at least one cell to have a maximum constant current output of greater than 20 amperes, preferably greater than 30 amperes, most preferably greater than 40 amperes. The maximum constant current output is the quantity of current of a cell or an energy supply device that can be drawn without the cell or the energy supply device reaching an upper temperature limit. Possible upper temperature limits can lie in a region of 60° C. or 70° C., without being restricted thereto. The unit for the maximum constant current output is amperes.

All intermediate values should also always be considered to be disclosed in the case of all the value ranges that are mentioned in the context of the present invention. For example, values of between 20 and 30 A, that is to say 21, 22.3, 24, 25.55 or 27.06 amperes etc. for example, should also be considered to be disclosed in the case of the maximum constant current output. Furthermore, values of between 30 and 40 A, that is to say 32, 33.3, 36, 38.55 or 39.07 amperes etc. for example, should also be considered to be disclosed.

It is preferred in the context of the invention for the energy supply device to have a discharge C rate of greater than $80 \cdot t^{\wedge}(-0.45)$, where the letter "t" stands for time in the unit seconds. The C rate advantageously allows quantification of the charging and discharge currents for energy supply devices, wherein the discharge C rate used here renders possible, in particular, the quantification of the discharge currents of energy supply devices. For example, the maximum permissible charging and discharge currents can be indicated by the C rate. These charging and discharge currents preferably depend on the rated capacity of the energy supply device. The unusually high discharge C rate of $80 \cdot t^{\wedge}(-0.45)$ advantageously means that the energy supply device can be used to achieve particularly high discharge currents which are required for operating powerful power tools in the construction industry. For example, the discharge currents can lie in a region of greater than 40 amperes, preferably greater than 60 amperes or even more preferably greater than 80 amperes.

It is preferred within the meaning of the invention for the cell to have a cell temperature gradient of less than 10 kelvins. The cell temperature gradient is preferably a measure of temperature differences within the at least one cell of the energy supply device, wherein it is preferred in the context of the invention for the cell to have a temperature distribution that is as uniform as possible, that is to say for a temperature in an inner region of the cell to differ as little as possible from a temperature which is measured in the region of a casing or outer surface of the cell.

It is preferred in the context of the invention that an energy supply device with the properties mentioned represents a powerful energy supply device, such as is referred to in the context of the present invention for example as an energy supply device of the first type. Such energy supply devices are preferably set up to supply particularly powerful power tools with electrical energy. The energy supply devices with the features mentioned preferably represent energy supply devices which can be regarded as representatives of future cell technologies.

BRIEF DESCRIPTION OF THE DRAWINGS

Further advantages will become apparent from the following description of the figures. The figure, the description and the claims contain numerous features in combination. A person skilled in the art will expediently also consider the features individually and combine them to form useful further combinations.

Identical and similar components are denoted by the same reference signs in the figure, in which.

DETAILED DESCRIPTION

Figure 1:
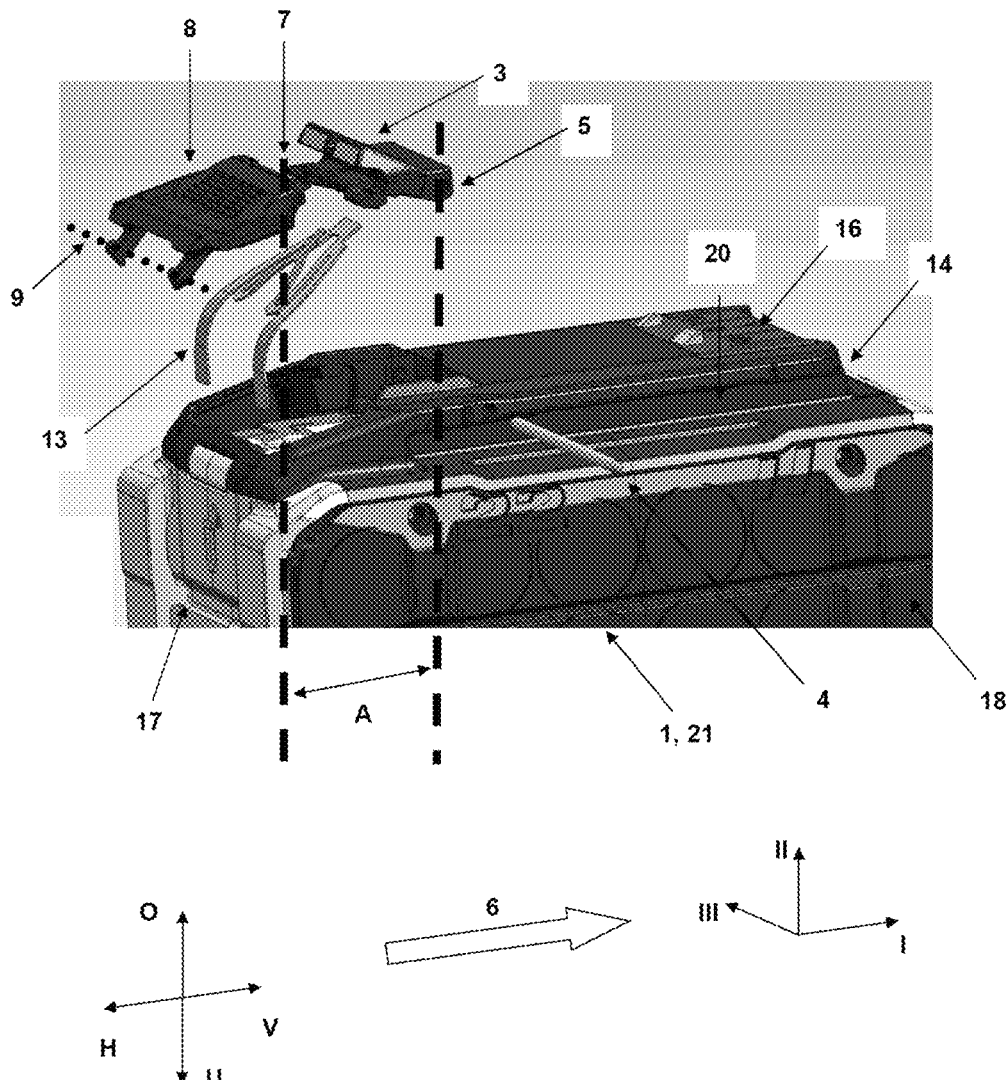
FIG. 1 shows a view of a preferred refinement of the locking mechanism

FIG. 1 shows a view of a preferred refinement of the locking mechanism of an energy supply device 1. In particular, a locking element 3, an actuating element 8 and a prestressing element 13 are illustrated. The locking element 3 has a pivot point 5, the locking element 3 being mounted rotatably about the pivot point 5. An axis of rotation 4, which forms the center of the rotatability of the locking element 3, runs through the pivot point 5 of the locking element 3. The actuating element 8 has a pivot point 10, the actuating element 8 being mounted rotatably about the pivot point 10 (see, e.g., FIG. 3). An axis of rotation 9, which forms center of the rotatability of the actuating element 8, runs through the pivot point 10 of the actuating element 8. The location 7 at which the locking element 3 and an undercut 26 of the power tool 2 (see FIGS. 2 and 5) intermesh in order to form a lock is referred to as the "locking location 7" in the context of the invention.

The energy supply device 1 is set up to supply a power tool 2 with electrical energy. For this purpose, the energy supply device 1 can be introduced into a cavity of the power tool 2. The energy supply device 1 is introduced into the power tool 2 along an insertion direction 6 which preferably coincides with a first axis I of a virtual coordinate system which is used to describe the invention. The virtual coordinate system also includes a second axis II and a third axis III. In the exemplary embodiment of the invention illustrated in FIG. 1, the axis of rotation 4 of the locking element 3 and the axis of rotation 9 of the actuating element 8 run substantially parallel to the third axis III of the virtual coordinate system.

Figure 3:
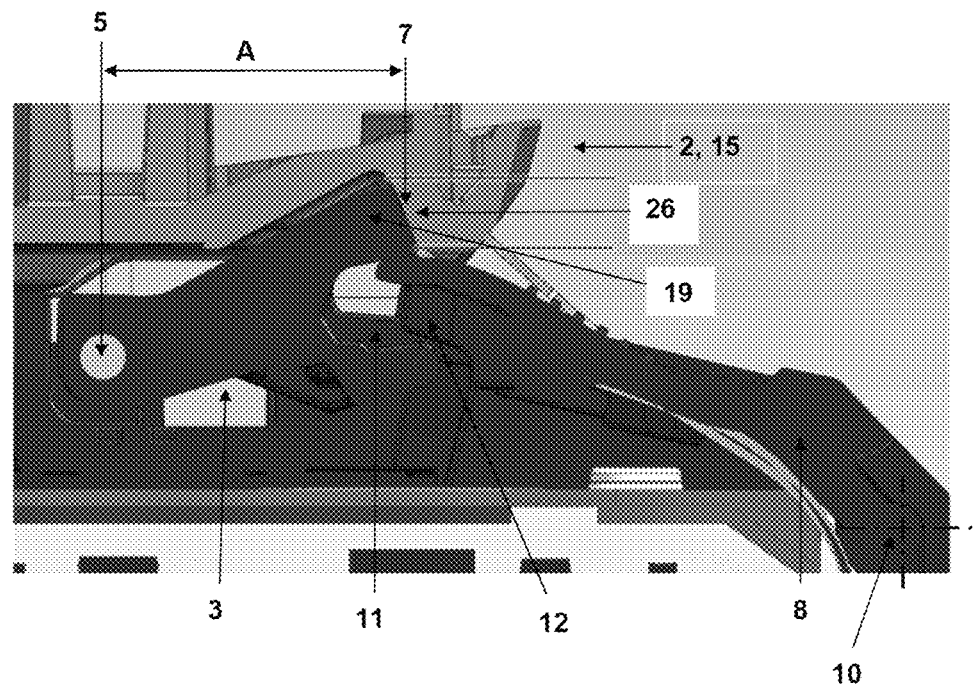
FIG. 3 shows a detailed view of the locking element and the actuating element (locking position)

As can be seen from FIGS. 1 and 3, the pivot point 5 of the axis of rotation 4 of the locking element 3 precedes the locking location 7 in the insertion direction 6. In the context of the invention, this preferably means that a distance A can be defined between the locking location 7 and the pivot point 5 of the axis of rotation 4 of the locking element 3. This distance A is marked in FIG. 1 by an arrow with two arrowheads.

In order to connect the energy supply device 1 to the power tool 2, the energy supply device 1 has an interface 14, which preferably represents a mechanical interface. The interface 14 is present on a top side of the energy supply device 1. In a front region 18 of the energy supply device 1, the energy supply device 1 has a data and/or power interface 16, which can be used to exchange data between the energy supply device 1 and the power tool 2 in the connected state or to transfer electrical energy from the energy supply device 1 in the direction of the power tool 2. The energy supply device 1 has the locking mechanism with locking element 3 and actuating element 8 in a rear region 17. The interface has a linear guide 20 with a guide groove, and a protruding region. The power tool 2 has a receiving device 15 which can receive the interface 14 of the energy supply device 1 in the connected state.

Figure 2:
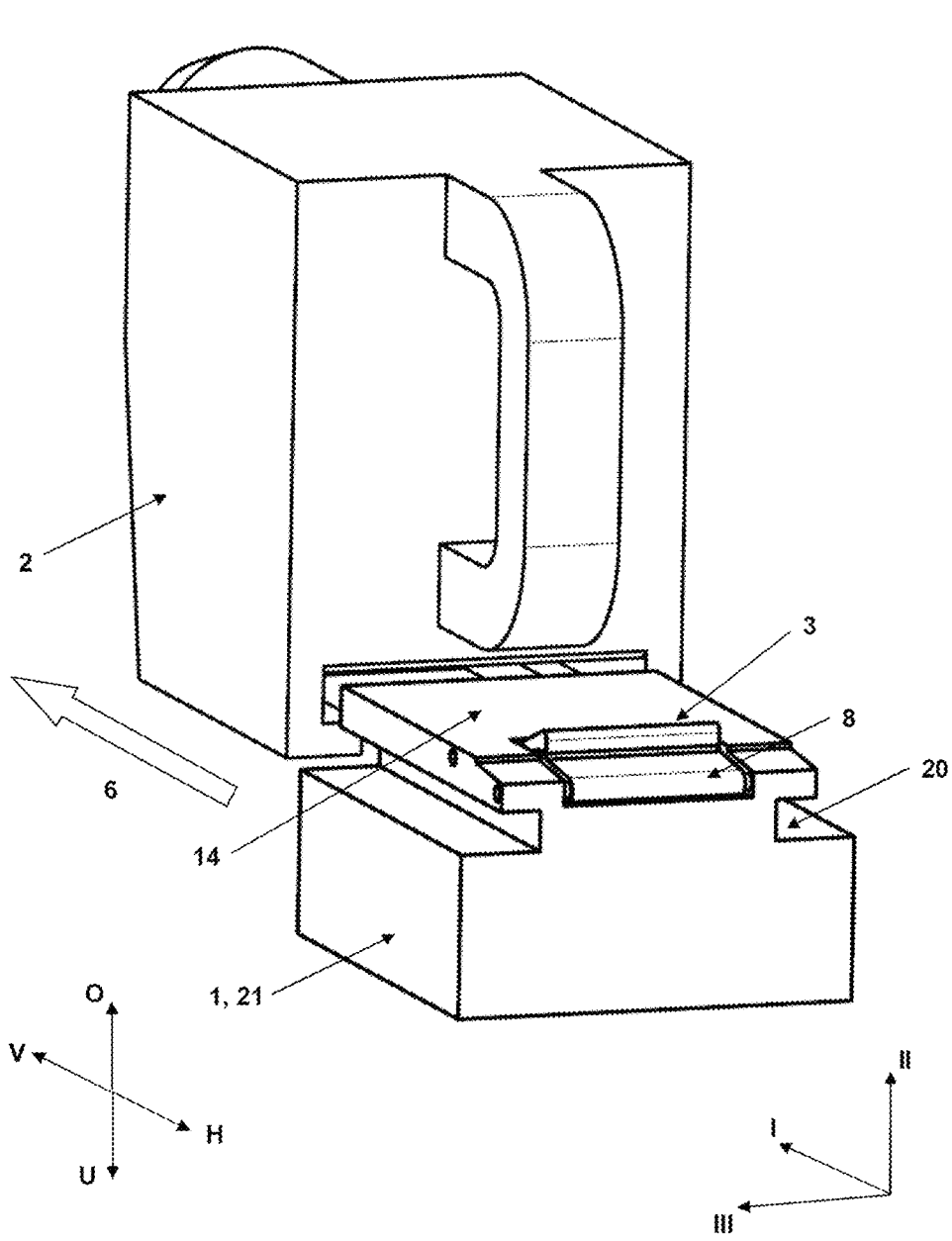
FIG. 2 shows a schematic view of a rear side of a preferred refinement of a power tool and an energy supply device

FIG. 2 schematically shows a rear view of the power tool 2 and an energy supply device 1, the energy supply device 1 being prepared to be introduced into a cavity in the power tool 2. The side of the energy supply device 1 facing the viewer is the rear side of the energy supply device 1. The energy supply device 1 is preferably inserted into the power tool 2 in the insertion direction 6 or in the direction of the first axis I of the virtual coordinate system, with guidance in the lateral direction and upward or downward being made possible by the linear guide 20. The energy supply device 1 has an interface 14 which can interact with a receiving device 15 of the power tool 2 (receiving device 15: see, for example, FIGS. 3 and 4). In addition, the locking mechanism which has a locking element 3 and optionally an actuating element 8 is illustrated in FIG. 2.

FIG. 3 shows a detailed view of the locking element 3 and the actuating element 8. In particular, a locking position of the locking mechanism, in which the locking element 3 or a protruding region of the locking element 3 is received in an indentation 26 of the receiving device 15 of the power tool 2, is shown in FIG. 3. The energy supply device 1 can thereby be locked in the power tool 2. In particular, a prestressing element 13 presses the locking element 3 into the indentation 26 of the receiving device 15 such that the locking element 3 is held securely and stably in the indentation 26. In the context of the invention, the indentation 26 of the receiving device 15 is preferably referred to as "undercut". Through the engagement of the locking element 3 and the undercut 26, a "locking location 7" can be defined, which can be preceded by a pivot point 5 of the locking element 3 and followed by a pivot point 10 of the actuating element 8. A distance A can be defined between the locking location 7 and the pivot point 5 of the locking element 3, by which the pivot point 5 of the locking element 3 precedes the locking location 7 in the insertion direction 6.

Figure 4:
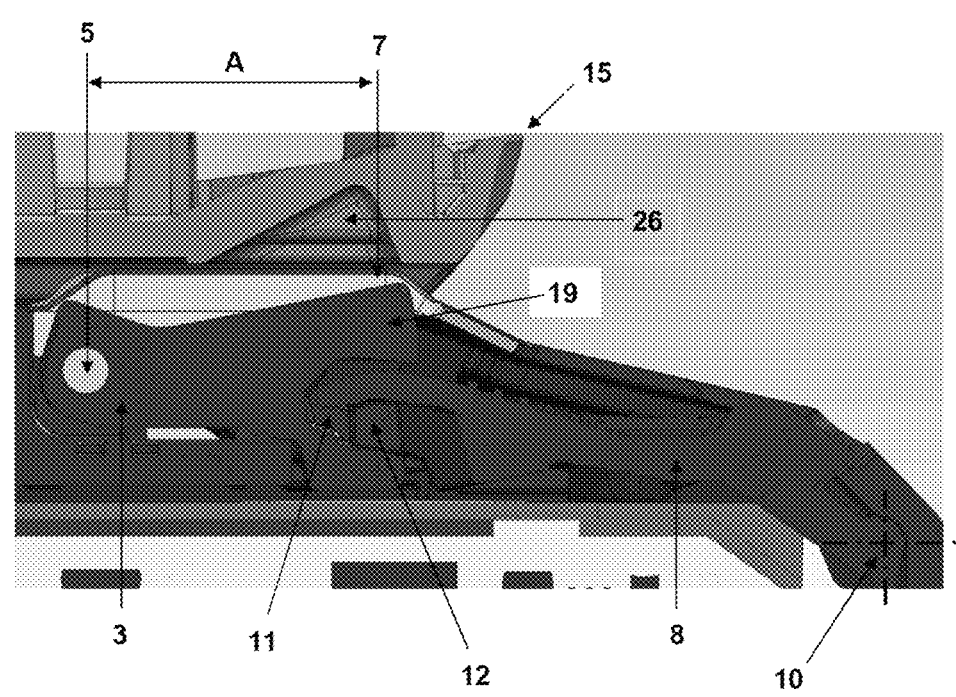
FIG. 4 shows a detailed view of the locking element and the actuating element (release position)

The locking element 3 has a bulge 11 which, in the event of release (FIG. 4), can interact with a protruding region 12 of the actuating element 8 or they can enter into engagement with one another. The elements 3, 8 intermesh in the region of the bulge 11 and the protruding region 12 of the actuating element 8 such that, in the event of release, the locking element 3 is pressed downward so that it leaves the undercut 26 in the power tool 2 and the energy supply device 1 can be removed from the power tool 2. In the event of locking (FIG. 3), the protruding region 12 of the actuating element 8 is not or is at most partially present in the bulge 11 of the locking element 3, wherein a prestressing element 13, 23 (see, e.g., FIG. 1) can be provided in order to press the locking element 3 into the undercut 26 in the power tool 2 or to keep the locking element 3 in the undercut 26 and thus in the locking position. FIG. 4 shows a detailed view of the locking element 3 and the actuating element 8, the elements 3, 8 being present in particular in a release position of the locking mechanism.

Figure 5:
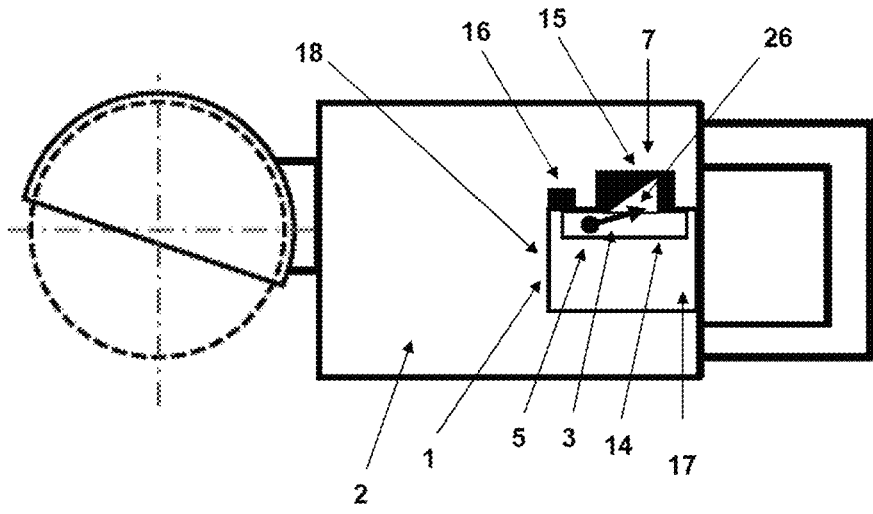
FIG. 5 shows a view of a preferred refinement of a power tool
Figure 5:
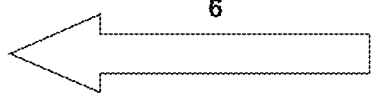

FIG. 5 shows a schematic view of a preferred refinement of a power tool 2. The power tool 2 can usually include a tool, operating elements and/or handles. The power tool 2 can in particular also have a motor. The power tool 2 can be connected to an energy supply device 1 ("connected state") to enable the energy supply device 1 to supply the power tool 2 with electrical power. The energy supply device 1 can have an interface 14 which can interact with a receiving device 15 of the power tool 2. The energy supply device 1 has a data and/or power interface 16 in the region of the interface 14. The data and/or power interface 16 can be arranged in a front region 18 of the energy supply device 1, while the locking mechanism is arranged in a rear region 17 of the energy supply device 1.

The receiving device 15 of the power tool 2 can have an undercut 26, wherein the locking element 3 of the energy supply device 1 can be received in a locking position by the undercut 26 in the receiving device 15 of the power tool 2. The locking element 3 of the energy supply device 1 can rotate about its pivot point 5 and can thus be transferred between a locking position and a release position. The locking mechanism can include a prestressing element 13, 23, wherein the prestressing element 13, 23 can be set up to press the locking element 3 of the energy supply device 1 into the undercut 26 in the power tool 2. By actuation of an actuating element 8 of the locking mechanism (cf. FIGS. 3 and 4), the prestress of the prestressing element 13 can be released and the locking element 3 can be moved out of the undercut 26. This can be done, for example, by a tip of the locking element 3 moving out of the undercut 26 in the power tool 2 in a spatial direction U downward. The tip of the locking element 3 is preferably that region of the locking element 3 which is opposite the pivot point 5 of the locking element 3. In other words, the locking element 3 of the energy supply device 1 has a tip and a pivot point 5, with the tip and the pivot point 5 being arranged on opposite sides of the locking element 3, and a distance L3 being able to be defined by the tip 12 of the actuating element 8 and the pivot point of the actuating element 8 (cf. FIG. 10). As can be seen from FIG. 5, among other things, the pivot point 5 of the locking element 3 can precede the locking location 7 in the insertion direction 6.

Figure 6:
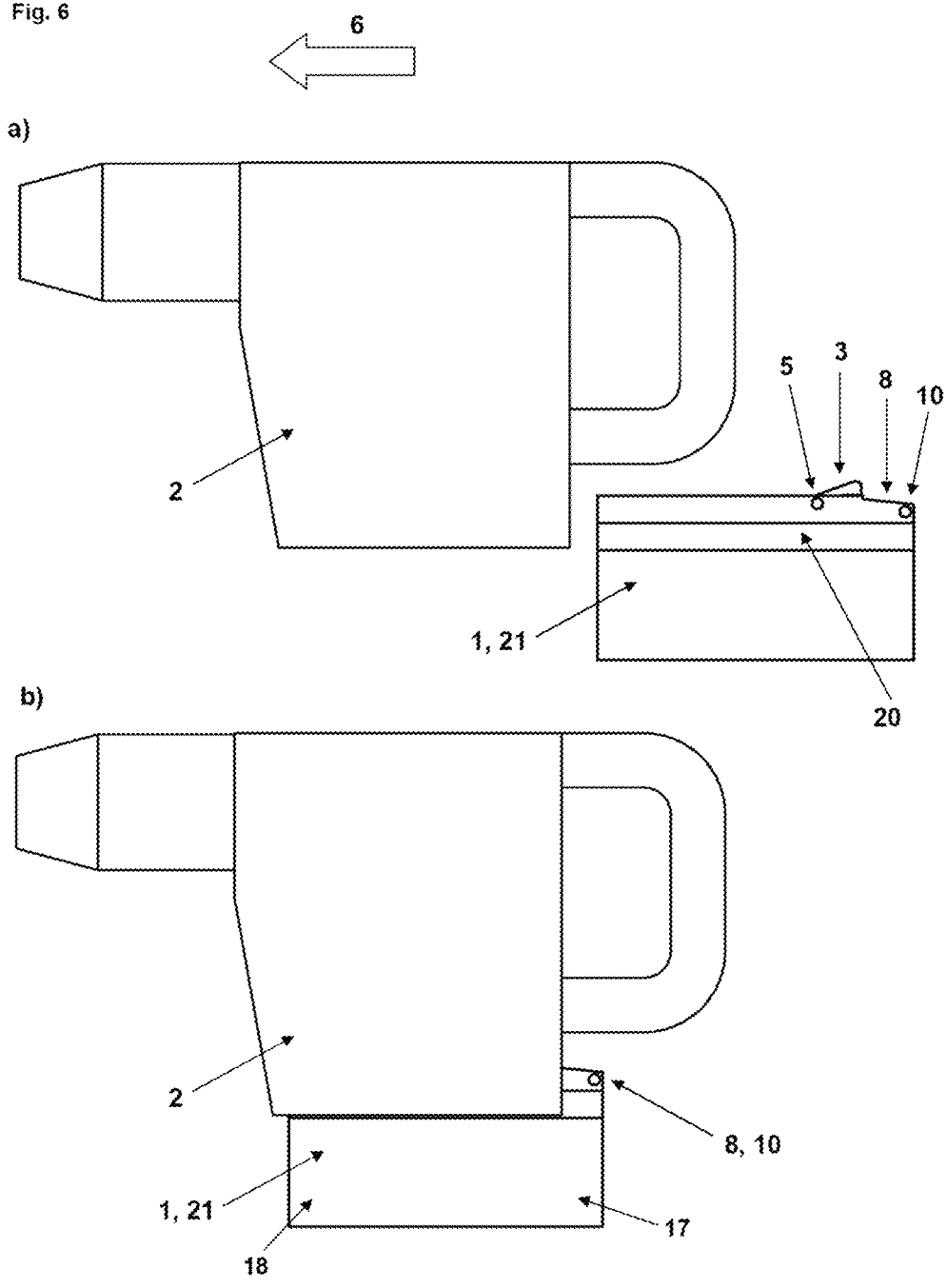
FIGS. 6*a* and 6*b* show schematic side views of a preferred refinement of a power tool and an energy supply device

FIGS. 6*a* and 6*b* show a schematic side view of a preferred refinement of a power tool 2 and an energy supply device 1. In FIG. 6*a*, the power tool 2 and the energy supply device 1 can be seen in a separate state, i.e. the energy supply device 1 is outside the power tool 2. The locking element 3 with its pivot point 5 and the actuating element 8 with its pivot point 10 can be seen in the upper half of the figure. The locking element 3 can be rotated about the first axis of rotation or spatial axis 4, while the actuating element 8 can be rotated about the second axis of rotation or spatial axis 9. Also indicated in FIG. 6*a* is the linear guide 20 which can facilitate the introduction of the energy supply device 1 into the power tool 2.

FIG. 6*b*) the power tool 2 and the energy supply device 1 are depicted in a connected or working state, i.e. the energy supply device 1 is at least partially received in the power tool 2. Only a rear region 17 of the energy supply device 1 that protrudes from the power tool 2 can be seen, said rear region 17 of the energy supply device 1 including the locking mechanism, in particular the actuating element 8 and its pivot point 10. The front region 18 of the energy supply device 1 is at least partially received in the power tool 2 in partial FIG. 6*b*).

Figure 7:
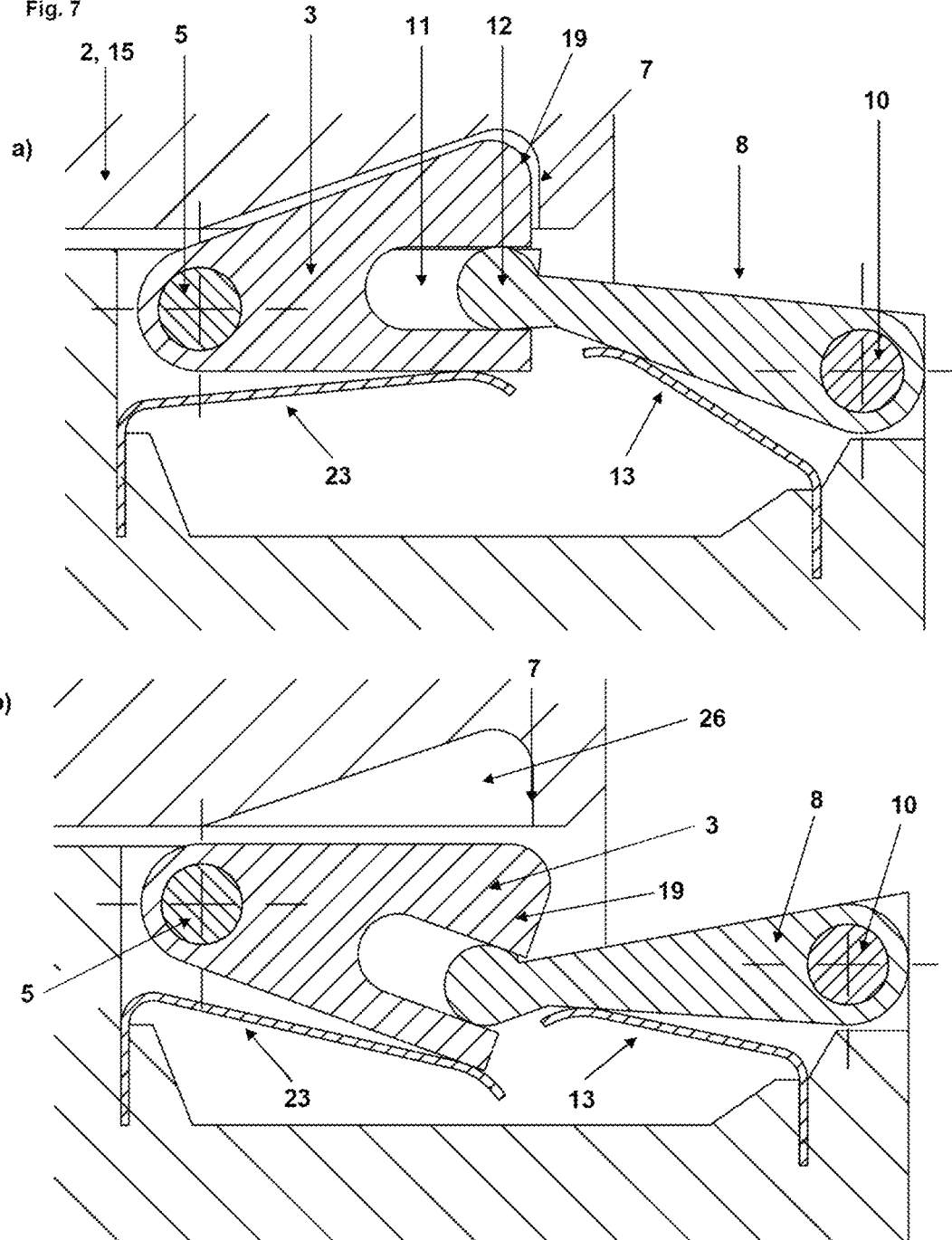
FIGS. 7*a* and 7*b* show a side view of a preferred refinement of the locking mechanism in a two-part form

FIGS. 7*a* and 7*b* show a side view of a preferred refinement of the locking mechanism in a two-part form. The exemplary embodiment of the invention illustrated in FIGS. 7*a* and 7*b* has a locking element 3 and an actuating element 8, with the locking position being shown in FIG. 7*a* and the release position of the locking mechanism, which is preferably designed in two parts, being shown in FIG. 7*b*. In the exemplary embodiment of the invention illustrated in FIG. 7*a*, the rear region 19 of the locking element 3 is received in the undercut 26 in the receiving device 15 of the power tool 2 in the locking position, and therefore the energy supply device 1 is locked in the power tool 2. The locking of the energy supply device 1 in the power tool 2 is preferably effected by the advantageous interaction of the elements 3, 8, it being possible for the locking to be further improved by means of the prestressing elements 13, 23. The prestressing elements 13, 23 press the locking element 3 upward such that the locking element 3 is received by the undercut 26 in the power tool 2.

The release is preferably effected by a user of the power tool 2 by actuation of the actuating switch 8. The front region 12 of the actuating element 8 can be received by an indentation 11 of the locking element 3, and therefore the locking element 3 is moved downward and thus out of the undercut 26 in the power tool 2 by the actuation of the actuating element 8. Said downward movement of the locking element 3 allows the locking mechanism to be transferred from the locking position (FIG. 7*a*) into the release position (FIG. 7*b*).

The locking mechanism illustrated in FIGS. 7*a* and 7*b* also has two prestressing elements 13, 23, with a first prestressing element 13 being arranged in the region of the actuating element 8 and a second prestressing element 23 in the region of the locking element 3. In the locking position (FIG. 7*a*), the elements 3, 8 are pressed in a spatial direction "upward" by the prestressing elements 13, 23. In particular, the locking element 3 is pressed into an undercut 26 in the power tool 2, while the actuating element 8 assists said tensioning of the locking element 3 by it itself also being pressed upward by the first prestressing element 13. The elements 3, 8 are furthermore coupled to one another in that a protruding region 12 of the actuating element 8 can be received by an indentation 11 of the locking element 3 such that a movement of the actuating element 8 also causes a movement of the locking element 3, preferably in the same direction. The locking element 3 is mounted rotatably about the pivot point 5 or the first axis of rotation 4, while the actuating element 8 can be mounted rotatably about the pivot point 10 or the second axis of rotation 9.

By actuation of the actuating element 8, for example by a user of the power tool 2, the front part 12 of the actuating element 8 is pressed downward, with the locking element 3 following this downward movement because of the coupling between the elements 3, 8. As a result, the rear region 19 of the locking element 3 disengages from the undercut 26 in the power tool 2 and the locking between the energy supply device 1 and the power tool 2 can be released (FIG. 7*b*). Said release allows the energy supply device 1 to be removed from the power tool 2 counter to the insertion direction 6. During the downward movement of the actuating element 8 and/or the locking element 3, work is carried out against the tension of the prestressing elements 13, 23 such that an undesired release of the locking between the energy supply device 1 and the power tool 2 is effectively avoided.

The locking location 7 can preferably be defined by a contact surface of the undercut 26, with said contact surface being able to be in contact with an end face of the locking element 3 in the event of locking (FIG. 7*a*).

Figure 8:
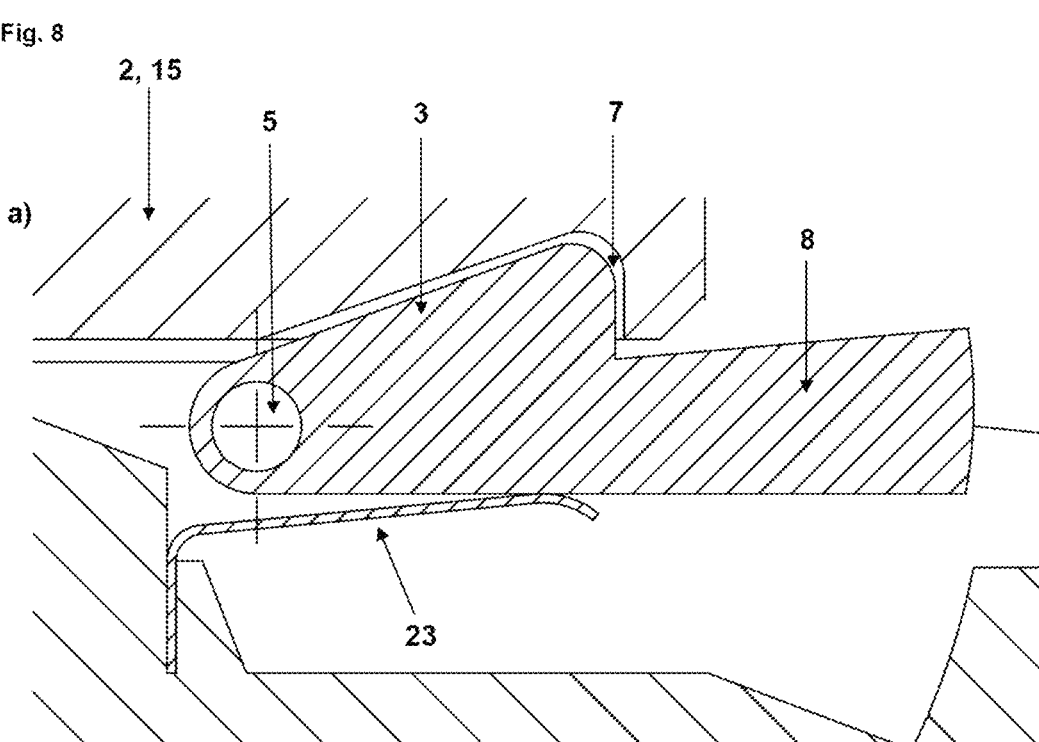
FIGS. 8*a* and 8*b* show a side view of a preferred refinement of the locking mechanism in a one-part form with a first axis of rotation
Figure 8:
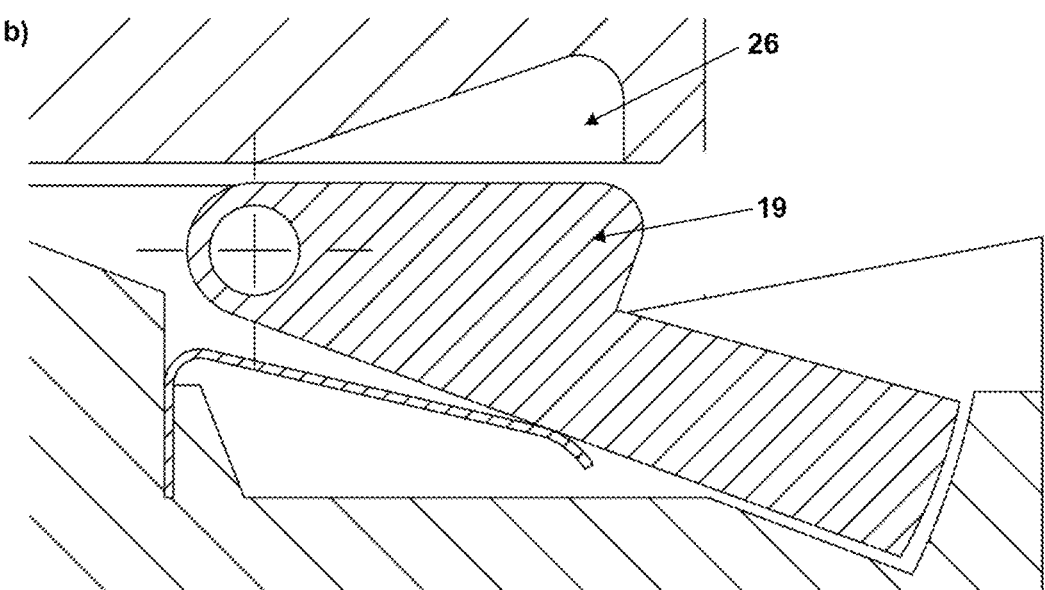

FIGS. 8a and 8b show a side view of a preferred refinement of the locking mechanism in a one-part form with a first axis of rotation 4. The locking mechanism has an element which has different functional regions 3, 8. In particular, the element of the locking mechanism has a locking region 3 and an actuating region 8, wherein the exemplary embodiment of the invention shown in FIG. 8a has a first axis of rotation 4 or a first pivot point 5 in the region of the locking region 3. The element can be rotated about said first axis of rotation 4 or about said first pivot point 5. In particular, the actuating region 8 of the element can be pressed downward by an actuation by a user of the power tool 2, as a result of which the locking mechanism can be transferred into a release position (FIG. 8b). The release position is preferably characterized in that a protruding region of the locking region 3 is not in engagement with an undercut 26 in the power tool 2, but rather just outside said undercut 26. The energy supply device 1 can be removed from the power tool 2 in this release position. FIG. 8 illustrates a second prestressing element 23 which is set up to press the element of the locking mechanism in a spatial direction "upward" such that the locking region 3 in a locking position (FIG. 8a) again enters into engagement with the undercut 26 in the power tool 2 and therefore the energy supply device 1 is locked in the power tool 2. The actuation of the actuating region 8 by the user is preferably undertaken counter to the prestressing force of the prestressing element 23.

Figure 9:
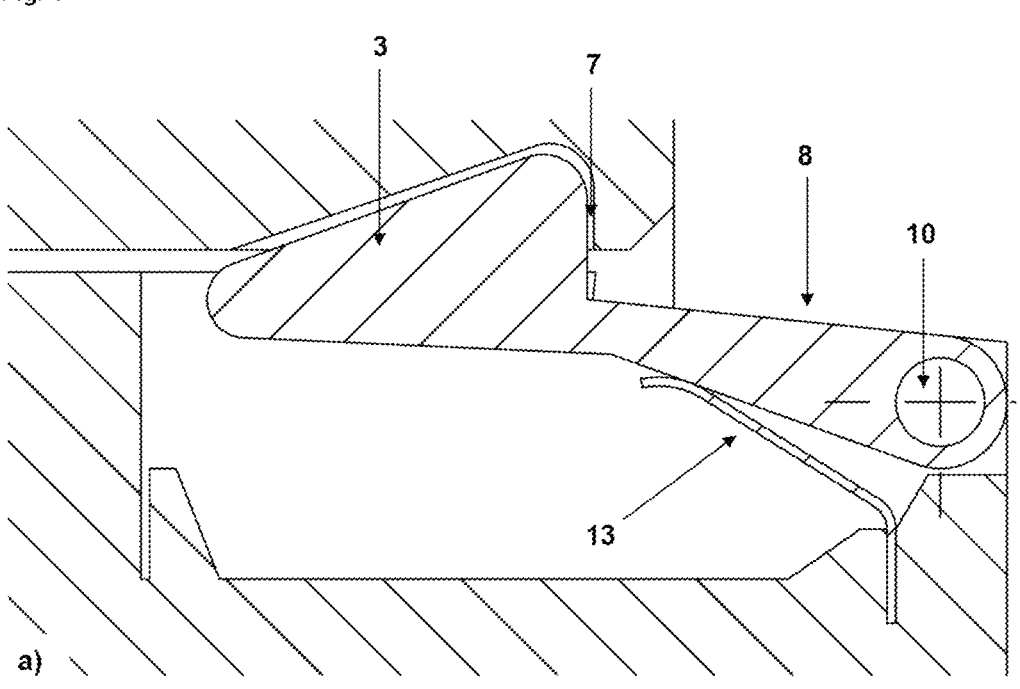
FIGS. 9*a* and 9*b* show a side view of a preferred refinement of the locking mechanism in a one-part form with a second axis of rotation
Figure 9:
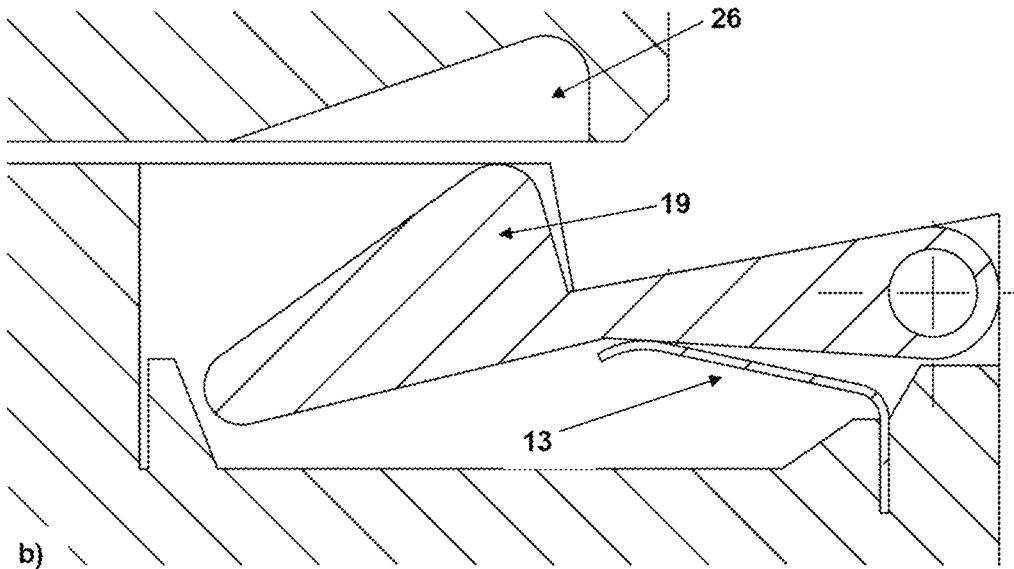

FIGS. 9 and 9b shows a side view of a further preferred refinement of the locking mechanism in a one-part form with a second axis of rotation 9 or a second pivot point 10. The second pivot point 10 and the second axis of rotation 9 can preferably be assigned to the actuating region 8 of the element of the locking mechanism. The locking mechanism shown in FIGS. 9a and 9b also has a locking region 3 and an actuating region 8, the locking mechanism shown having a second axis of rotation 9 or a second pivot point 10 in the region of the actuating region 8. The element can be rotated about said second axis of rotation 9 or about said second pivot point 10. In the one-part locking mechanism shown in FIG. 9, the locking region 3 of the element is pressed downward by an actuation by the user such that the locking mechanism can be transferred from a locking position (FIG. 9a) into a release position (FIG. 9b). The release position is preferably characterized in that the locking region 3 is not in engagement with an undercut 26 in the power tool 2, but rather just outside said undercut 26. The energy supply device 1 can be removed from the power tool 2 in the release position. FIG. 9a illustrates a first prestressing element 13 which is set up to press the element of the locking mechanism in a spatial direction "upward" such that the locking region 3 in a locking position (FIG. 9a) can again enter into engagement with the undercut 26 in the power tool 2, and therefore the energy supply device 1 is locked in the power tool 2.

Figure 10:
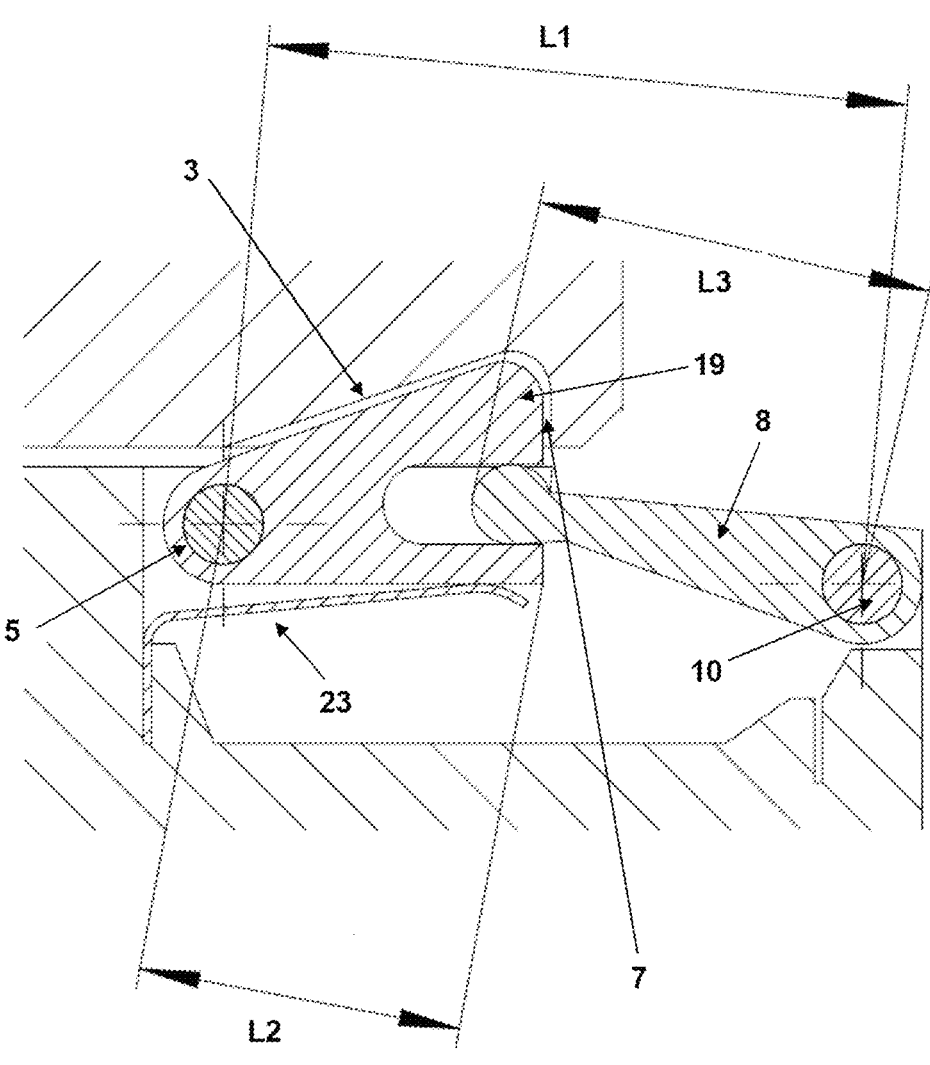
FIG. 10 shows a side view of a preferred refinement of the locking mechanism in a two-part form with lengths L1, L2, L3

FIG. 10 shows a side view of a preferred refinement of the locking mechanism in a two-part form with lengths L1, L2, L3. FIG. 10 shows in particular the locking mechanism in a locking position in which a rear region 19 of the locking element 3 is received in the undercut 26 in the power tool 2, as a result of which the energy supply device 1 and the power tool 2 are locked. The rear region 19 of the locking element 3 can, for example, comprise an end face or can be formed by an end face, with the end face of the locking element 3 being able to be in contact with a contact surface of the undercut 26 in the event of locking. It is preferred in the context of the invention that the sum of the lengths L2 and L3 is greater than the direct distance L1 between the pivot points 5 and 10. The length L2 is preferably the distance between the pivot point 5 of the locking element 3 ("first pivot point") and a tip or an end face of the locking element 3. The length L3 is preferably the distance between the pivot point 10 of the actuating element 8 ("second pivot point") and a tip 12 of the actuating element 8. Since the relation L2+L3>L1 is preferably satisfied, the tip 12 of the actuating element 8 can enter into engagement with an indentation 11 of the locking element 3, as a result of which the movements of the locking element 3 and of the actuating element 8 are coupled. Said advantageous coupling of locking element 3 and actuating element 8 makes it possible to transmit a movement of the actuating element 8 to the locking element 3. For example, a downward movement of the actuating element 8, which is caused, for example, by a user of the power tool 2 by the user pressing on the actuating element 8 in order to initiate removal of the energy supply device 1 from the power tool 2, can be transmitted via the coupling of the elements 3, 8 to the locking element 3. In this way, a downward movement of the actuating element 8 can lead to a downward movement of the locking element 3, as a result of which the rear region 19 of the locking element 3 slides out of the undercut 26 in the power tool 2 and the locking of the energy supply device 1 and the power tool 2 is released.

In the exemplary embodiment of the invention illustrated in FIG. 10, a second prestressing element 23 is depicted, which is preferably set up to press the locking element 3 from a release position into a locking position or to hold the locking element 3 in the locking position.

LIST OF REFERENCE SIGNS

1 Energy supply device
2 Power tool
3 Locking element
4 First axis of rotation, axis of rotation of the locking element
5 Pivot point of the locking element
6 Insertion direction
7 Locking location
8 Actuating element
9 Second axis of rotation, axis of rotation of the actuating element
10 Pivot point of the actuating element
11 Bulge of the locking element
12 Protruding region of the actuating element
13 Prestressing element in the region of the actuating element, first prestressing element
14 Interface of the energy supply device
15 Receiving device of the power tool
16 Data and power interface
17 Rear region of the energy supply device
18 Front region of the energy supply device
19 Rear tip of the locking element, end face of the locking element
20 Linear guide with guide groove
21 Battery pack
23 Prestressing element in the region of the locking element, second prestressing element
26 Undercut, indentation
A Distance between the locking location and the pivot point of the locking element
O Spatial direction "upward"
U Spatial direction "downward"
V Spatial direction "forward"

H Spatial direction "rearward"
I Axis 1
II Axis 2
III Axis 3

What is claimed is:

1. An energy supply device for a power tool, the energy supply device being detachably connectable to the power tool, the energy supply device comprising:

a lock element for locking the energy supply device in the power tool, the lock element being mounted rotatably about a first axis of rotation, the first axis of rotation running through a pivot point of the lock element, the pivot point of the lock element preceding a locking location defined by a locking contact surface during insertion in an insertion direction so that the pivot point enters the energy supply device before the locking contact surface; and an actuator for actuation by a user, wherein the actuator is mounted rotatably about a second axis of rotation, the second axis of rotation running through a pivot point of the actuator.

2. The energy supply device as recited in claim 1 wherein the lock element is set up to be received in a locking position by an undercut in the power tool.

3. The energy supply device as recited in claim 1 wherein the lock element is bringable from a release position into a locking position, or vice versa, by rotation about the pivot point.

4. The energy supply device as recited in claim 1 wherein the pivot point of the actuator follows the locking location in the insertion direction.

5. The energy supply device as recited in claim 1 wherein the lock element and the actuator form a lock mechanism designed at least in two parts.

6. The energy supply device as recited in claim 1 wherein the axis of rotation of the lock element and the axis of rotation of the actuator are parallel.

7. The energy supply device as recited in claim 1 wherein the lock element has a bulge and the actuator has a protruding region, the lock element set up to at least partially receive the actuator in a locking position.

8. The energy supply device as recited in claim 1 wherein the lock element is bringable from a locking position into a release position by actuation of the actuator.

9. The energy supply device as recited in claim 1 further comprising a prestressing element set up to press the lock element or the actuator into an undercut in the power tool, or wherein the lock element or the actuator is bringable from a release position into a locking position by the prestressing element.

10. The energy supply device as recited in claim 9 wherein the prestressing element is a spring.

11. The energy supply device as recited in claim 1 wherein a sum of the lengths L2 and L3 is greater than a distance L1 between the pivot point of the lock element and the pivot point of the actuator, wherein the length L2 corresponds to the distance between the pivot point of the lock element and a tip of the lock element and the length L3 to the distance between the pivot point of the actuator and a tip of the actuator.

12. A power tool for connection to the energy supply device as recited in claim 1, the power tool comprising an undercut forming a receiving space for the lock element of the energy supply device.

13. The power tool as recited in claim 12 wherein the undercut is arranged in a region of a receiving device of the power tool.

14. A power tool in combination with the energy supply device as recited in claim 1, the power tool comprising an undercut forming a receiving space for the lock element of the energy supply device, the energy supply device when inserted having the pivot point of the lock element further inside the power tool than the locking location.

15. The power tool in combination with the energy supply device as recited in claim 14, wherein the second axis of rotation is separate from the first axis of rotation and located outside the power tool.

16. The energy supply device as recited in claim 1 comprising a front side for insertion in the insertion direction into the power tool and a rear side opposite the front side, the pivot point of the lock element thus being closer to the front side than the locking location.

* * * * *